US011119924B2

(12) United States Patent
Ito

(10) Patent No.: US 11,119,924 B2
(45) Date of Patent: Sep. 14, 2021

(54) INTERFACE DEVICE INCLUDING PORTS AND A CACHE MEMORY, AND CONTROL METHOD THEREOF

(71) Applicant: CANON KABUSHIKI KAISHA, Tokyo (JP)

(72) Inventor: Tadayuki Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 171 days.

(21) Appl. No.: 15/919,608

(22) Filed: Mar. 13, 2018

(65) Prior Publication Data

US 2018/0276126 A1    Sep. 27, 2018

(30) Foreign Application Priority Data

Mar. 22, 2017    (JP) .............................. JP2017-056459

(51) Int. Cl.
| | |
|---|---|
| *G06F 12/0815* | (2016.01) |
| *G06F 12/0855* | (2016.01) |
| *G06F 12/0853* | (2016.01) |
| *G06F 12/084* | (2016.01) |
| *G06F 12/0846* | (2016.01) |

(52) U.S. Cl.
CPC ........ *G06F 12/0815* (2013.01); *G06F 12/084* (2013.01); *G06F 12/0846* (2013.01); *G06F 12/0853* (2013.01); *G06F 12/0855* (2013.01); *G06F 2212/1008* (2013.01); *G06F 2212/1021* (2013.01)

(58) Field of Classification Search
None
See application file for complete search history.

(56) References Cited

U.S. PATENT DOCUMENTS

| | | | |
|---|---|---|---|
| 6,347,344 B1 * | 2/2002 | Baker | G06F 13/102 345/501 |
| 8,343,814 B2 * | 1/2013 | Bucki | G11C 15/00 257/213 |
| 8,452,944 B2 | 5/2013 | Ito | |

(Continued)

FOREIGN PATENT DOCUMENTS

| | | |
|---|---|---|
| JP | 2011008773 A | 1/2011 |
| JP | 2012243026 A | 12/2012 |

OTHER PUBLICATIONS

U. Kang et al., "8 GB 3-D DDR3 DRAM Using Through-Silicon-Via Technology," in IEEE Journal of Solid-State Circuits, vol. 45, No. 1, pp. 111-119, Jan. 2010. (Year: 2010).*

*Primary Examiner* — Edward J Dudek, Jr.
*Assistant Examiner* — Ralph A Verderamo, III
(74) *Attorney, Agent, or Firm* — Rossi, Kimms & McDowell LLP

(57) ABSTRACT

In order to allow efficient data communication, an interface device that includes N ports, comprises: a cache memory that is shared by the N ports and includes a plurality of cache tags each of which is allocated to one of the N ports; and N cache determination units corresponding to the N ports. Each of the N cache determination units comprises: a determiner configured to determine, based on all of the values of the plurality of cache tags, whether a cache miss has occurred in the cache memory, and an update unit configured to update, when the determiner determines that a cache miss has occurred, cache tag values allocated to a self-port.

16 Claims, 22 Drawing Sheets

(56) References Cited

U.S. PATENT DOCUMENTS

| | | | |
|---|---|---|---|
| 9,235,522 B2 | 1/2016 | Ito | |
| 2008/0065833 A1* | 3/2008 | Hosoki | G06F 12/084 |
| | | | 711/130 |
| 2012/0030453 A1* | 2/2012 | Ito | G06F 15/8015 |
| | | | 712/233 |
| 2012/0246450 A1* | 9/2012 | Abdallah | G06F 9/5077 |
| | | | 712/216 |
| 2012/0297143 A1* | 11/2012 | Ito | G06F 12/126 |
| | | | 711/137 |
| 2015/0019803 A1* | 1/2015 | Miller | G06F 3/0611 |
| | | | 711/105 |
| 2016/0154753 A1* | 6/2016 | Gittins | G06F 13/1663 |
| | | | 710/117 |
| 2016/0378674 A1* | 12/2016 | Cheng | G06F 12/1009 |
| | | | 711/206 |

* cited by examiner

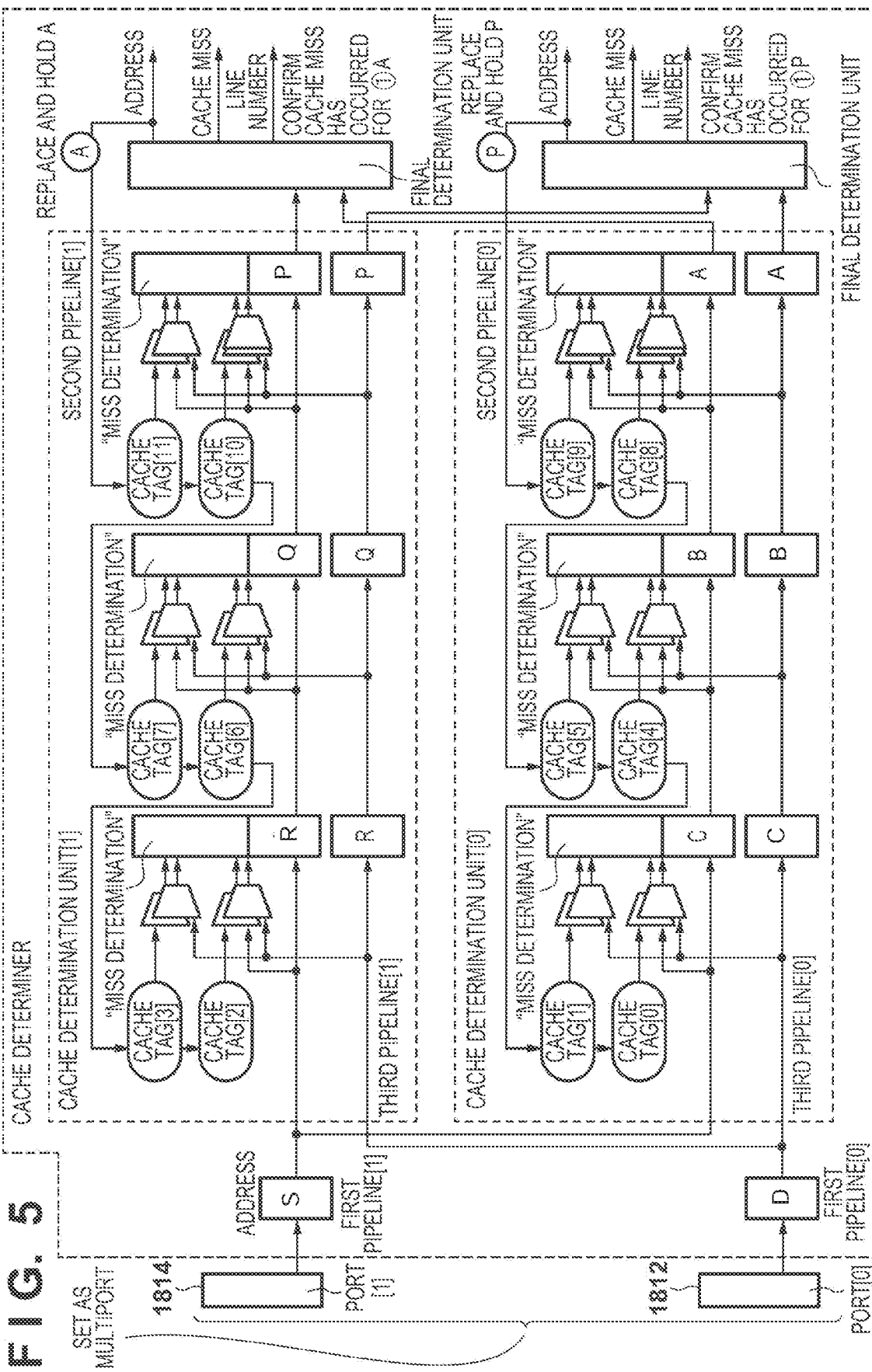

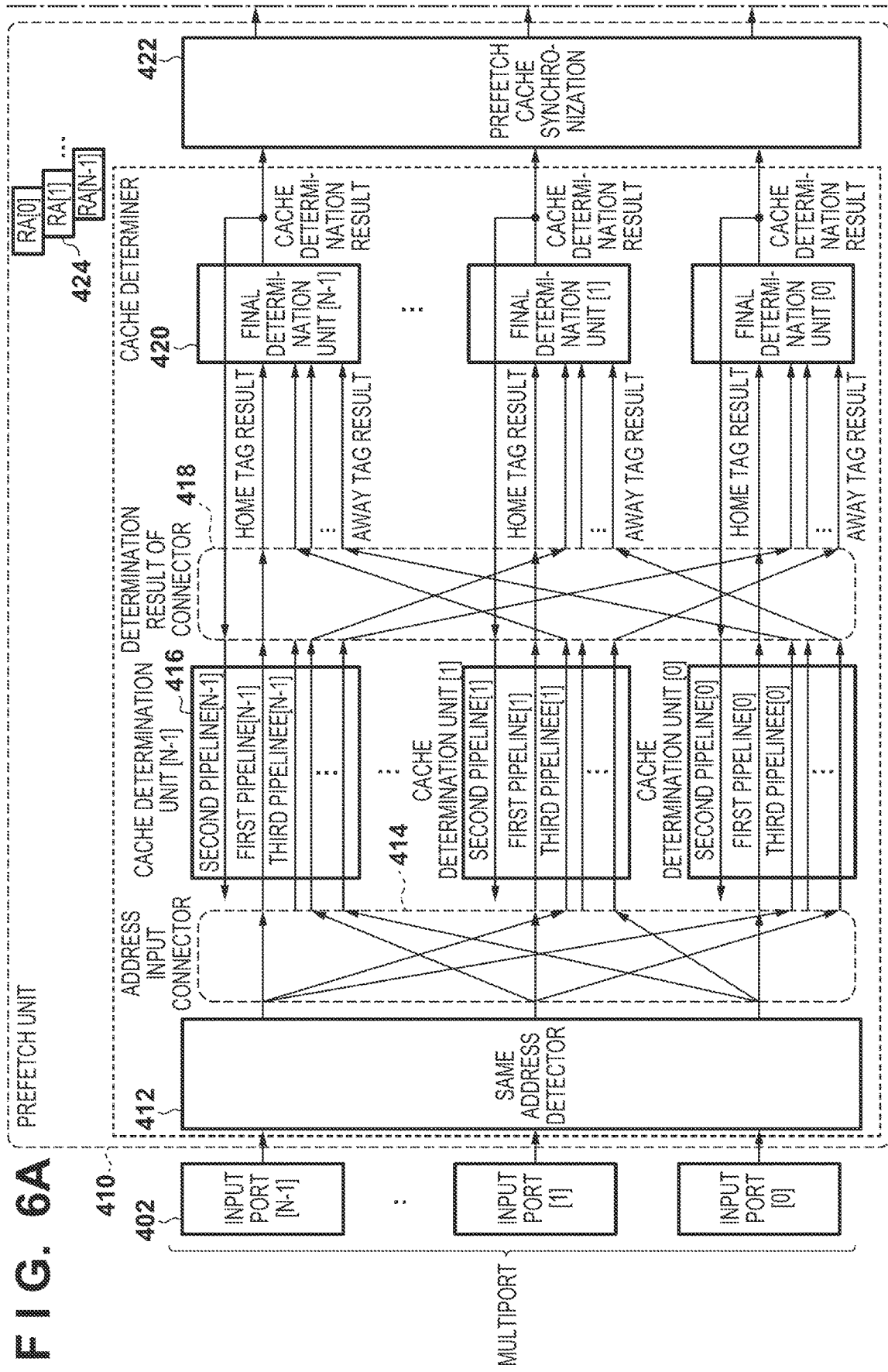
F I G. 6A

FETCH OPERATION OF PORT [i]

INTERFACE DEVICE INCLUDING PORTS AND A CACHE MEMORY, AND CONTROL METHOD THEREOF

BACKGROUND OF THE INVENTION

Field of the Invention

The present invention relates to a data communication technique.

Description of the Related Art

In recent years, due to increased miniaturization of semiconductor processes, even semiconductor chips for embedded devices have undergone large-scale integration, and very many masters are present in a chip. Since many masters read/write data from/in an external memory (DRAM or the like), accesses to the external memory concentrate. As a result, continuous accesses to an external memory will lead to accesses to different DRAM pages and banks, and this increases random accessibility. Hence, as a result, DRAM page misses, bank conflicts, and read/write switching frequently occur, and the memory access latency becomes very long. This ultimately results in the degradation of the performance of the embedded device.

On the other hand, in the specification development of a DRAM, which is a storage device generally used as an external memory, the operation frequency of the DRAM standard has doubled due to the necessity of memory bandwidth improvement. For example, the operation frequency has increased from a DDR3-DRAM to a DDR4-DRAM and a DDR5-DRAM. As a result, the frequency of the memory access control of the embedded device needs to be increased in accordance with the increased frequency of the DRAM.

Also, in a next-generation high performance DRAM, there are standards such as HBM (High Bandwidth Memory), HMC (Hybrid Memory Cube), Wide I/O, and the like. In these high performance DRAMs, stacked DRAMs are connected by a TSV (Through Silicon Via) technique. Since these standards have a very high operating frequency and a very large connection bus width, a wide memory bandwidth can be provided. Also, since their power consumption is low because the TSV technique does not require a terminal connection with a DRAM which is outside of the chip, it is possible to simultaneously implement both a speed increase and power savings in the semiconductor chip. Therefore, it is necessary to sufficiently use the memory bandwidth that has been made possible by the large bus width and the increased frequency of the next-generation high performance DRAM.

Additionally, in order to develop a large-scale embedded semiconductor chip without prolonging the development period, it has become common to adopt a development method of reusing and incorporating conventional image processing modules (data processing circuits). In this case, the reused image processing modules (data processing circuits) are designed according to a previous generation external memory (DRAM) standard. Hence, as these modules have a small memory access unit (transfer length) for each memory access, it is difficult to sufficiently bring out the performance of the latest external memory (DRAM) standard. Also, since no measures are taken against the high memory-access latency in a reused image processing module, the performance will degrade instead. Furthermore, because of the increased scale of systems which are to be constructed, in some cases, it may be necessary to connect a plurality of semiconductor chips to each other and to connect various types of sensors to a semiconductor chip.

In Japanese Patent Laid-Open No. 2012-243026, there is disclosed a method of concealing a DRAM access latency and maintaining performance by reading a necessary image in advance and accumulating the image in a cache memory even when the DRAM access latency is high. Additionally, Japanese Patent Laid-Open No. 2011-8773 discloses a fully associative-type cache tag determination method that has good cache efficiency.

However, in recent years, in the development of large-scale chips by miniaturization of semiconductor processes, very many data circuits (masters) are present in a chip even in the case of a semiconductor chip for embedded application. Since each data processing circuit (master) separately performs memory access, the same data is requested to the DRAM from data processing circuits (master), and unnecessary overlapping memory accesses are performed. Also, when many memory accesses are caused by many uncontrolled data processing circuits (masters), access conflicts to the DRAM occur frequently, and DRAM page misses, read/write switching, and bank conflicts occur. Thus, the latency of one memory access operation becomes very high. Since the above-described conventional techniques do not consider a case in which very many data processing circuits (master) are not controlled and perform memory accesses to the DRAM, performance degradation occurs.

Also, the above-described conventional techniques do not disclose any measures for a form using a next-generation DRAM, a form in which a plurality of semiconductor chips are connected to each other, and a form in which many sensors are connected to a semiconductor chip. Furthermore, the above-described conventional techniques do not disclose any measures for reused image processing modules (data processing circuits), for a case in which new and old sensors with different specifications are present, and for a case in which sensor specifications are changed.

SUMMARY OF THE INVENTION

The present invention controls memory accesses by a plurality of data processing circuits (masters) to allow efficient data communication.

According to one aspect of the present invention, an interface device that includes N ports, comprises: a cache memory that is shared by the N ports and includes a plurality of cache tags each of which is allocated to one of the N ports; N cache determination units corresponding to the N ports, wherein each of the N cache determination units comprises a determiner configured to determine, based on all of the values of the plurality of cache tags, whether a cache miss has occurred in the cache memory, and an update unit configured to update, when the determiner determines that a cache miss has occurred, cache tag values allocated to a self-port.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a block diagram showing the detailed arrangement of a cache determiner;

FIGS. 6A and 6B are block diagrams showing an example of the detailed arrangement of the multiport shared cache;

DESCRIPTION OF THE EMBODIMENTS

Preferred embodiments of the present invention will be described in detail below with reference to the accompanying drawings. Note that the following embodiments are merely examples and do not limit the scope of the present invention.

First Embodiment

An example of a multiport shared cache incorporated in an information processing apparatus will be raised as an interface device of the first embodiment according to the present invention.

<1. Apparatus Arrangement>

Figure 1A:
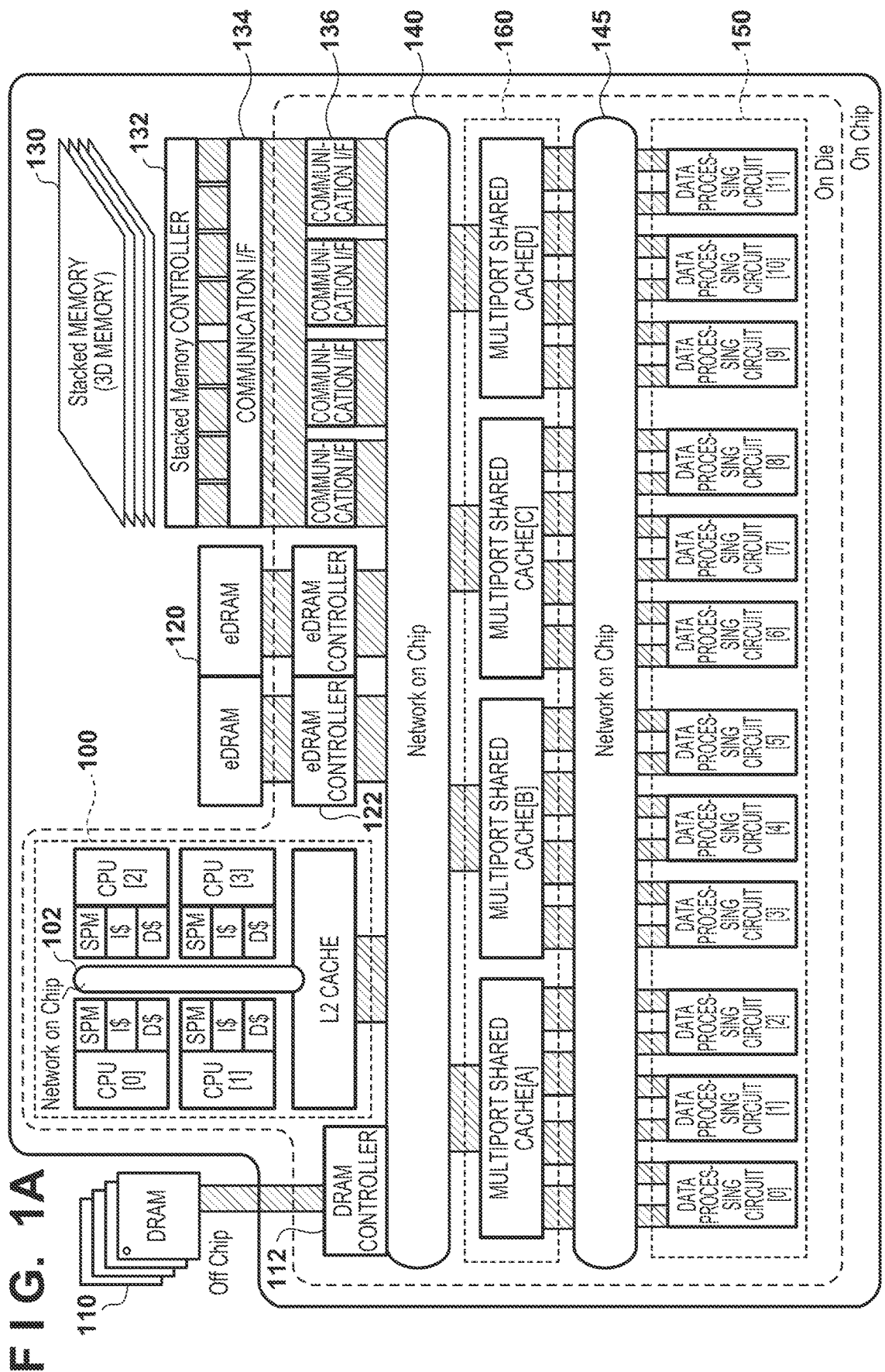
FIGS. 1A and 1B are block diagrams each showing the arrangement of an information processing apparatus according to the first embodiment.

FIG. 1A is a block diagram showing the arrangement of the information processing apparatus according to the first embodiment. More specifically, FIG. 1A shows an information processing apparatus to which a multiport shared cache formed to be capable of accepting data requests via N ports has been inserted.

The information processing apparatus includes a CPU circuit unit 100, external memories, an image processing unit 150, and the multiport shared cache 160. A DRAM 110, an eDRAM (embedded DRAM or mixed DRAM) 120, and a stacked memory (three-dimensional memory) 130 are examples of external memories. The information processing apparatus also includes a system bus (Network On Chip/shared bus) 140, an image processing bus (Network On Chip/shared bus) 145, and the like.

The CPU circuit unit 100 includes Multicore CPUs [0] to [3] and a processor bus (Network On Chip/processor shared bus) 102. Also, the CPU circuit unit 100 is formed so that it is possible to access and a ROM (not shown) for storing permanent data and programs, the DRAM 110 used to load programs and temporarily store data, and an external storage device (not shown) such as an HDD. The CPU circuit unit 100 controls the image processing unit 150 and integrally controls the sequence of the information processing apparatus.

The external storage device stores parameters, programs, and correction data to be used in the CPU circuit unit 100 and the image processing unit 150. It may be arranged so that the data and programs of the DRAM 110 will be loaded from the external storage device. Also, in this embodiment, a plurality of data processing circuits [0] to [11] in the image processing unit 150 each include a DMAC (Direct Memory Access Controller) (not shown) and perform data transfer via the DMAC. At this time, the storage destination of the transferred data is not limited to the DRAM 110, the eDRAM 120, the stacked memory 130, and may be an external storage device.

Figure 1B:
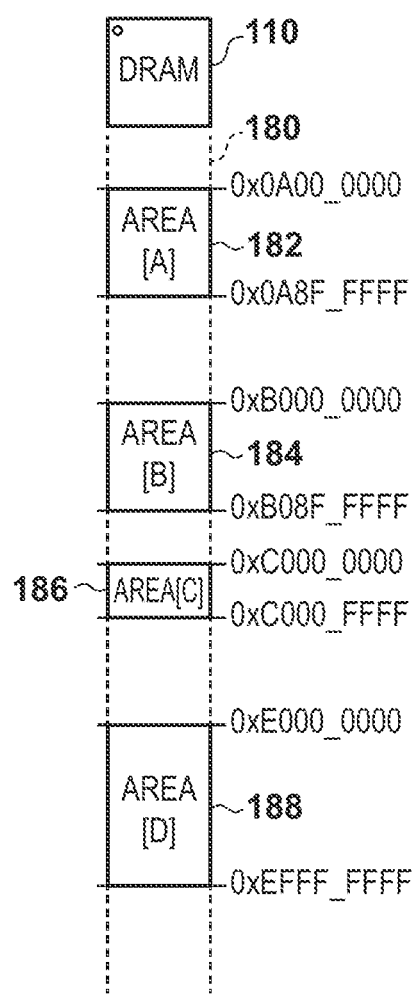

FIG. 1B is a view showing the arrangement of the memory area of the DRAM 110. In particular, FIG. 1B shows an example of the allocation of the plurality of multiport shared caches. In this embodiment, in order to cope with the above-described problem, the multiport shared cache 160 is inserted between the DRAM 110, the eDRAM 120, and the stacked memory 130 serving as external memories and the image processing unit 150. Each of the multiport shared caches [A] to [D] is separately allocated to each corresponding memory area as shown in FIG. 1B. For example, the multiport shared cache [A] is allocated to an area [A] of FIG. 1B. Each of the multiport shared caches [B] to [D] is allocated to the corresponding one of areas [B] to [D].

<2. Apparatus Operation>

Consider a case in which the data processing circuit [0] reads out, from the DRAM 110, the data of the area [A] whose addresses (address values) are 0×0A00_0000 to 0×0A8F_0000. In this case, the data request of the data processing circuit [0] is issued to the image processing bus (Network On Chip/shared bus) 145, and this data request is broadcast to the multiport shared caches [A] to [D]. The multiport shared cache [A] receives this data request since the addresses of the data request are associated with the memory area [A]. The multiport shared cache [A] performs cache determination and returns the cache data to the data processing circuit [0] if it is determined that a cache hit has occurred. If a cache miss is determined by the cache determination, the multiport shared cache [A] makes a data request to the DRAM 110, refills the cache data, and returns the readout cache data to data processing circuit [0]. In the case of a cache miss, the multiport shared cache [A] transmits a data request to the system bus (Network On Chip/shared bus) 140 and reads out the necessary data.

The image processing bus (Network On Chip/shared bus) 145 has a sufficient transfer bandwidth, and even when all of the data processing circuits [0] to [11] have issued data requests in parallel, data requests are delivered to the multiport shared caches [A] to [D] in parallel.

If no multiport shared caches [A] to [D] are present, all of the data requests of the data processing circuits [0] to [11] will concentrate to the DRAM 110. Since the multiport shared caches [A] to [D] are provided in this embodiment, the data requests of the data processing circuits [0] to [11] first undergo cache determination in parallel by the multiport shared caches [A] to [D]. Subsequently, the multiport shared caches [A] to [D] allow only data requests related to a cache miss to access the DRAM 110. Hence, data requests to the DRAM 110 are discrete, thereby relieving the access concentration to the DRAM 110 in this embodiment. Additionally, since the multiport shared cache has been adopted, the plurality of data processing circuits share the cache. As a result, it allows the cache data of a data processing circuit connected to a predetermined port to be referred to by a data processing circuit connected to another port, and data requests to an external memory need not overlap.

Also, a suitable transfer length can be selected for each of the multiport shared caches [A] to [D] depending on the type of the memory (the DRAM 110, the eDRAM 120, and the stacked memory 130). For example, assume that the area [A] of FIG. 1B is the area of the DRAM 110, the area [C] is the area of eDRAM 120, and the area [D] is the area of the stacked memory 130. The transfer length of the multiport shared cache [A] corresponding to the area [A] is set to 128-Byte transfer in accordance with the specification of the DRAM 110. The transfer length of the multiport shared cache [C] corresponding to the area [C] can be set to 256-Byte transfer in accordance with the specifications of the eDRAM 120. The transfer length of the multiport shared cache [D] corresponding to the area [D] can be set to 2K-Byte transfer in accordance with the specification of the stacked memory 130. As a result, it is possible to select an appropriate transfer length in accordance with the specification of the external memory.

In order to maintain the DRAM performance in accordance with each generation of the DRAM standard or a next generation DRAM standard in this manner, the transfer length for each memory access is appropriately increased to conceal the latency that occurs at the time of bank conflict or read/write switching of the DRAM. Particularly, in order to sufficiently take advantage of the memory bandwidth produced by the higher frequency and the large bus width of a next generation high-performance DRAM, an extremely long transfer length is selected as the transfer length of the area.

Also, the data processing circuits [0] to [11] have been designed in accordance with the specifications (transfer lengths) of the respective new and old DRAM generations. As a result, the data requests of the respective data processing circuits [0] to [11] have different transfer lengths, and a data request having an appropriate transfer length in accordance with the DRAM cannot be made if a data request is made directly to the external memory (the DRAM 110, the eDRAM 120, or the stacked memory 130). Since data requests that have inappropriate transfer lengths for the respective external memories (the DRAM 110, the eDRAM 120, and the stacked memory 130) coexist, the external memories may not have a desired performance.

However, in this embodiment, each of the data processing circuits [0] to [11] will access the external memory (the DRAM 110, the eDRAM 120, or the stacked memory 130) always via the multiport shared caches [A] to [D]. Each of the multiport shared caches [A] to [D] can set the transfer length in accordance with the external memory to which the data request will be issued. Hence, even if the transfer lengths of the data requests of the data processing circuits [0] to [11] do not have appropriate transfer lengths with respect to the corresponding external memories, the transfer lengths can be converted into appropriate transfer lengths according to the specifications of the external memories by the multiport shared caches [A] to [D]. As a result, even a data processing circuit that has been designed in accordance with the specification of an old generation DRAM can be reused without decreasing the performance of the latest DRAM.

Note that by changing the cache line length (refill line length) forming each cache memory of this embodiment (to be described later), it is possible to control the transfer length for each memory access. Also a non-blocking transfer amount can be adjusted by changing the capacities of the reception buffer and the transmission buffer of the data acquisition unit (to be described later).

In an embedded semiconductor chip, the cache memory of the aforementioned multiport shared cache cannot have a large capacity due to cost restraints. However, since each of the plurality of data processing circuits [0] to [11] that have no dependence with each other will separately transmit a data request, cache conflict tends to occur. Hence, in this embodiment, a fully associative-type multiport shared cache is inserted as will be described later.

As described above, in the method according to this embodiment, the multiport shared cache accesses a corresponding external memory (the DRAM 110, the eDRAM 120, or the stacked memory 130) in intermittently large memory access units (transfer lengths) only when a cache miss has occurred.

By such control, the external memory can maintain its performance since it does not receive data requests in small memory access units. Also, when a cache hit has occurred, since data is returned from the multiport shared cache, the memory bandwidth of the overall chip apparently increases by a port count. Since access is distributed by the port count of the plurality of multiport shared caches, access conflict to the DRAM is reduced. In addition, the increase in memory access latency caused during an arbitration standby at the time of access conflict is reduced, and the average latency of the overall semiconductor chip is shortened. Hence, it is possible to maintain the image processing performance, and it becomes easier to reuse image processing that has been developed in a (previous) semiconductor process/DRAM generation.

As described above, in establishing the standard of a DRAM that is a general storage device which serves as an external memory, the frequency is highly increased to improve the memory bandwidth. On the other hand, a logic circuit such as an ASIC used for an embedded device cannot be directly connected to the above-described high-frequency DRAM since the logic circuit does not operate at a high operational frequency of several GHz like a most advanced processor.

In this embodiment, the multiport shared cache serves as an interface that arbitrates between the high-frequency DRAM and an image processing module (logic circuit). The arrangement of a multiport shared cache will be described next.

<3. Small Circuit-Scale Cache Determination>

Figure 2:
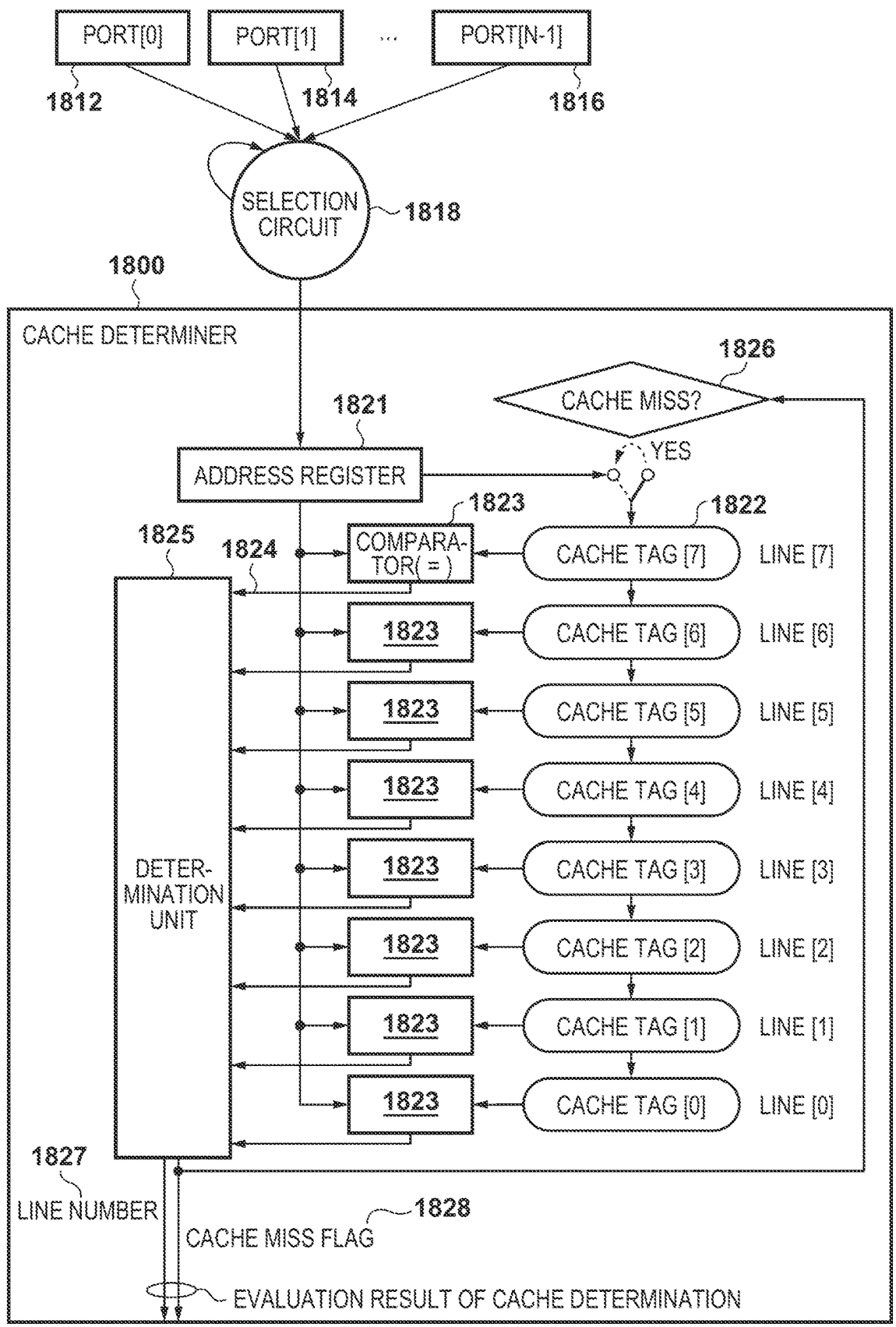
FIG. 2 is a view showing an example of the arrangement of a conventional multiport shared cache.

FIG. 2 is a view showing an example of the arrangement of a cache determiner in a conventional multiport shared cache. Here, data requests are input from N ports of port [0] to port [N−1]. In general, the requests are sequentially allocated by a selection circuit 1818 to the cache determiner with respect to the conflict between the plurality of data requests. That is, since the plurality of shared cache tags do not need to simultaneously process the plurality of data requests from the N ports, the circuit scale is small, and cache tag replacement (update) at the time of a cache miss (to be described later) does not require any special devices. The basic operation of a cache determiner 1800 whose association (line selection) method is of a fully associative type will be described hereinafter with reference to FIG. 2.

When a data request that has been selected by the selection circuit 1818 which selects the data request in a round-robin manner, the cache determiner 1800 holds the address (address value) in an address register 1821. Eight cache tags 1822 have been stored in the cache determiner 1800, and the cache determiner 1800 serves as an 8-node fully associative-type cache device. Numbers [0] to [7] have been set in advance to the eight cache tags 1822, and each of these numbers indicates the "relative" cache line number of a corresponding cache memory. The reason why each number is a "relative" number will be described later. Eight comparators 1823 determine whether the input address of the address register 1821 and each of the eight cache tags 1822 "match" each other. Eight comparison results 1824 are output from the comparators 1823 to a determination unit 1825.

If at least one of the eight comparison results 1824 is a "match", it is evaluated as a cache hit. If none of the eight comparison results 1824 is a "match", it is evaluated as a cache miss. Each evaluation result is output as a cache miss flag 1828 from the cache determiner 1800.

When the evaluation result indicates a cache hit, the "relative" line number of "matching" cache tag is output from the cache determiner 1800 as a line number 1827.

When the evaluation result indicates a cache miss (YES in a branch 1826), the input address is written in the cache tags 1822, and the cache tags are updated. Each of the cache tags 1822 is a storage area formed by a shift register. When the evaluation result indicates a cache miss, the values of the cache tags moves to downstream cache tags by a shift operation. That is, the value of the cache tag [1] is written in the cache tag [0], and the value of the cache tag [2] is written in the cache tag [1]. The same writing operation is repeated, and the value of the cache tag [7] is written in the cache tag [6]. The value of the input address is written finally in the cache tag [7]. When the evaluation result indicates that a cache miss has occurred, the cache tag update as described above is performed, and the value of line [7] is output as the line number 1827 from the cache determiner 1800.

A cache tag replacement method by which the tag information of an old cache tag [0] is always swept is called "FIFO method (round robin method)". Since the device can be easily implemented in a fully associative-type cache device, "FIFO method (round robin method)" is often adopted as the replacement method.

When the form is considered as an interface device, it can be said that the "FIFO method (round robin method)" is a desirable method as requests will be swept from the old requests in accordance with the data read/write request order.

Finally, the cache determiner 1800 adds the input address to the cache miss flag 1828 and the line number 1827 which were acquired in the above-described manner and outputs the resultant data as the cache determination result.

By selecting data requests from a plurality of ports and inputting the selected data requests in the cache determiner as described above, the cache determiner of a multiport shared cache can be easily formed. However, this method is not suitable for high-speed processing since cache determination can be performed for only one request per one cycle among the plurality of data requests. However, the circuit arrangement is simple, and cache determination is performed in a small circuit scale.

<4. Cache Determination Parallelized According to Port Count>

Figure 3:
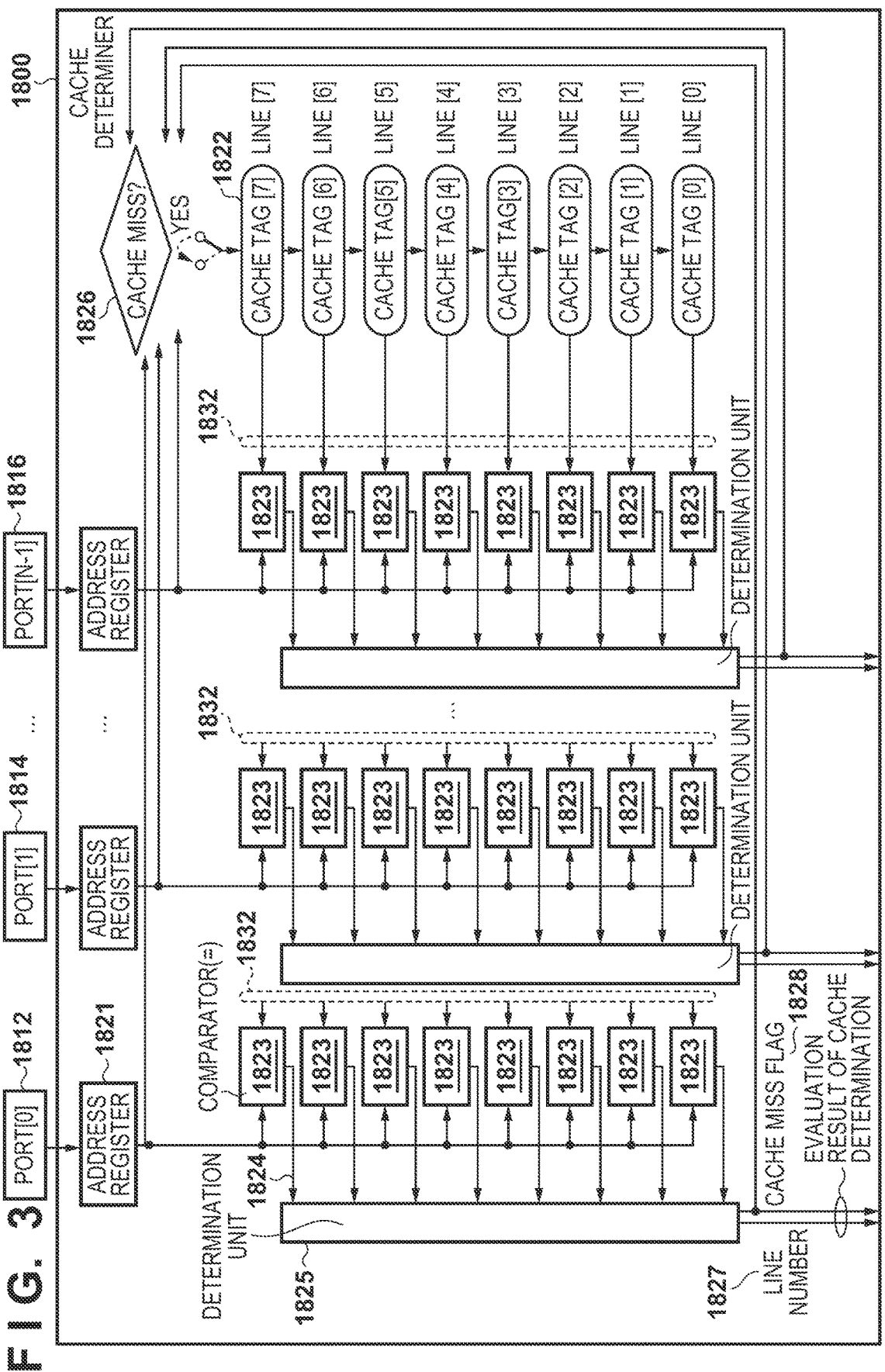
FIG. 3 is a view showing another example of the conventional multiport shared cache.

FIG. 3 is a view showing another example of the arrangement of the cache determiner in a multiport shared cache. An arrangement in which the address register 1821, the determination unit 1825, and the comparators 1823 are parallelized in accordance with the port count will be described.

When the objective is cache sharing, the eight cache tags 1822 [0] to [7] need to be shared by N ports. Hence, a cache tag value 1832 is connected to all of the parallelized comparators. In the arrangement of FIG. 3, although the circuit scale of the comparators and the determination units will increase, since the cache determination will operate in parallel with respect to the data requests of the N ports, the processing is faster than that of the arrangement of FIG. 2.

On the other hand, when the result of cache determination indicates a cache miss, the cache tags need to be replaced as described above. Since data requests of N ports are processed simultaneously in the arrangement of FIG. 3, a plurality of (maximum N) cache misses can occur simultaneously with respect to the data requests of the N ports. Hence, it is necessary stop the input from the N ports until the replacement of the plurality of cache misses is completed, thereby reducing the processing speed for the number of cache misses. However, although the circuit arrangement is simple, cache determination can be performed at higher speed than in the arrangement of FIG. 2.

<5. Cache Determination Using Counterflow Pipelines>

At this time, in the arrangement of FIG. 2, the processing speed decreases since the data requests from the N ports are sequentially selected and determined. In the arrangement of FIG. 3, the processing speed decreases since cache tags need to be rewritten by sequentially selecting the replacement of the cache misses of the N ports.

Also, a technique of improving the operating frequency by pipelining the cache determiner of each of FIGS. 2 and 3 can be considered. However, while pipelining can implement the operation by a very high frequency, a correct cache determination result cannot be acquired if the replacement operation at the time of a cache miss and the comparators of each pipeline do not appropriately operate in synchronism. Hence, only simply parallelizing the comparators and the determiners in accordance with the port count, in the same manner as FIG. 3 will not be enough as a measure to implement a multiport shared cache. Since a pipeline operation is being performed, a measure, as that described in FIG. 3, of stopping input while the cache misses of N ports as replacements are sequentially selected to rewrite the cache tags, does not allow synchronization with the comparators of each pipeline. Therefore, the correct cache determination result cannot be acquired.

Furthermore, since the cache tags are shared by the N ports, a replacement by a cache miss of a given port can sweep the cache tag of a succeeding cache hit of another port. As a result, a cache conflict called thrashing occurs between the plurality of ports, and thus the performance of the overall system is heavily degraded.

The speed up of the aforementioned multiport shared cache I/F will be described below. More specifically, an arrangement in which cache determination is performed by using counterflow pipelines will be described.

Figure 4:
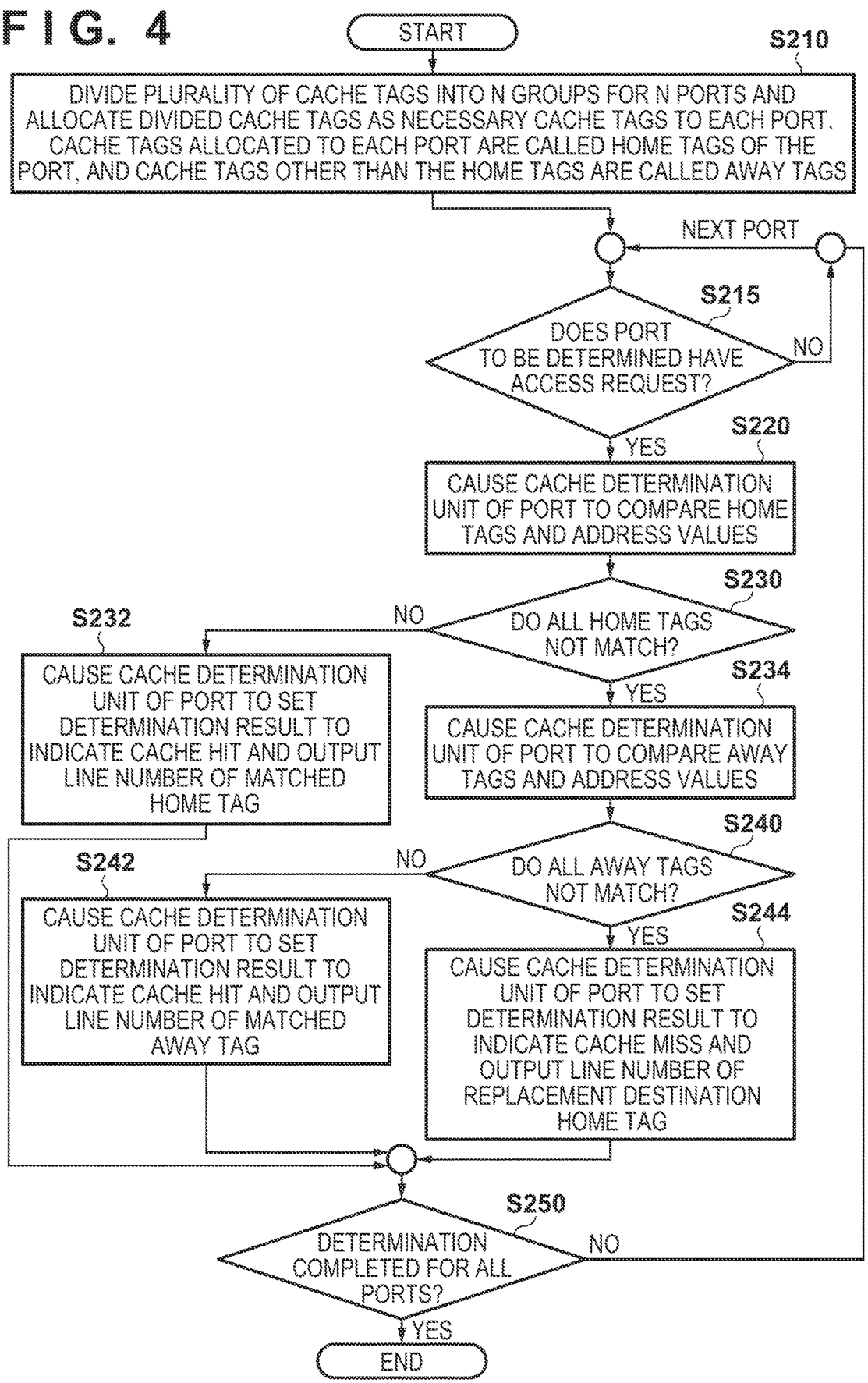
FIG. 4 is a flowchart showing an example of an operation in a cache determiner.

FIG. 4 is a flowchart showing an example of the operation in the cache determiner. Although the cache determiner performs cache determination in accordance with the flowchart of FIG. 4, the cache determiner first confirms the configuration of the cache tag in the following manner.

First, a plurality of cache tags to be shared from the N ports are divided into N groups and are allocated as necessary cache tags to each port (step S210). At this time, having a large number of cache tags to be allocated will be advantageous for the replacement of the cache tags (to be described later). Hence, the number of cache tags to be allocated is increased for important ports in accordance with the use case, such as a high priority order port, a port with a low cache hit rate (many cache misses), and the like. In each port, a cache tag allocated to a port itself (self-port) will be referred to as a "home tag" hereinafter. A cache tag other than the home tag of a predetermined port (that is, a cache tag allocated to a port other than the self-port) will be referred to as an "away tag". The home tags of each port are exclusive, and when all of the home tags are assembled, the number of the home tags will be the total number of cache tags. Also, the away tags of each port will partially include the same cache tags but will not belong to the same set because the respective ports have different home tags.

Next, the presence/absence of a data request of each port is confirmed. If there is no data request, the cache determination is skipped (NO in step S215). If there is a data request in a port that is to undergo cache determination (YES in step S215), the following cache determination will be executed.

First, the cache determiner of a predetermined port compares the home tags with the address values of the data request (step S220). If a cache tag that matches one of the home tags is found (NO in step S230), the cache determiner sets the determination result to indicate a cache hit and outputs the line number of the matching home tag (step S232). On the other hand, if a cache tag that matches one of the home tags is not found (YES in step S230), the cache determiner of the predetermined port compares the address values of the data request with the away tags (step S234).

If a cache tag that matches one of the away tags has been found (NO in step S240), the cache determiner sets the determination result as a cache hit and outputs the line number of the matching away tag (step S242). On the other hand, if no matching cache tag can be found for the away tags (YES in step S240), the cache determiner of the predetermined port will set the determination result as a cache miss. The cache determiner selects a replacement destination from the home tags, replaces the home tags, and outputs the replacement destination of the home tags as line numbers (step S244).

The above-described determination is performed of each of the N ports and repeated (NO in step S250) until the determination of all of the ports is completed. When all of the ports are completed (YES in step S250), the cache determination by the cache determiner has been completed.

To maintain high performance, it is necessary to perform the above-described cache determination in short cycles (preferably one cycle), and cache comparators and a final determination unit are provided for each port to parallelize the cache determination of each port. Also, if the cache tags increase, the delay amount of the combination circuit formed from the comparators and the final determination unit is increased, and it becomes difficult to improve the operating frequency. Therefore, it is preferable to form the cache determiner as a pipeline circuit as that shown in FIG. 5.

FIG. 5 is a block diagram showing an example of the detailed arrangement of the cache determiner. To simplify the arrangement, assume that FIG. 5 includes a cache determiner provided with a two-port multiport shared cache, a port [0] and a port [1] each set with 6 cache tags as the home tags, that is, 12 cache tags in total, and that the cache determiner has a three-stage pipeline arrangement.

Cache tags [0], [1], [4], [5], [8], and [9] are referred to as home tags for the port [0]. Also, cache tags [2], [3], [6], [7], [10], and [11] are referred to as away tags.

Cache tags [2], [3], [6], [7], [10], and [11] are referred to as home tags for the port [1], and cache tags [0], [1], [4], [5], [8], and [9] are referred to as away tags.

Each port transmits an address string for comparison by a pipeline register (first pipeline). The port [0] inputs an address string {A, B, C, D, . . . } to the first pipeline [0], and the port [1] inputs an address line {P, Q, R, S, . . . } to the first pipeline [2].

The cache determiner needs to replace the cache tags when the determination result indicates a cache miss. The home tags of the port [0] are formed from the pipeline register of [9], [8], [5], [4], [1], and [0]. When a replacement operation is to be executed, the address that resulted in a cache miss is input, and the values stored in the cache tags are moved only one stage (second pipe line of port [0]). In the same manner, the home tags of the port [1] are formed from the pipeline register of [11], [10], [7], [6], [3], and [2], and the values stored in the cache tags are moved only one stage by a replacement operation (second pipe line of port [1]).

In this embodiment, it is also necessary to compare the addresses with the cache tags stored in the respective away tags. Hence, each port transmits, via the pipeline register, an address string for comparison with each away tag (third pipeline). For example, the address string {A, B, C, D, . . . } of the port [0] is input to the third pipeline [1] of the port [1], and the address string {P, Q, R, S, . . . } of the port [1] is input to the third pipeline [0] of the port [0]. As a result, the address string {A, B, C, D, . . . } that is input from the port [0] can be compared to the cache tags [11], [10], [7], [6], [3], and [2] of the port [1] which are the away tags of the port [0]. Also, on the other hand, the address string {P, Q, R, S, . . . } that is input from the port [1] can be compared to the cache tags [9], [8], [5], [4], [1], and [0] of the port [0] which are the away tags of the port [1].

Miss determination (not a cache hit) based on the comparison between pipeline stages of the cache determination units of the respective ports is performed, and if all of the results from the comparison between the pipeline stages indicate cache misses, it is determined that a cache miss has occurred for this pipeline. The final determination unit of the final stage determines a cache miss by combining the determination results of the home tags of the first pipeline and the determination results of the away tags of the third pipeline of another port and confirms the determination result.

When an arrangement as that described above is adopted, the operating frequency can be improved by pipelining the cache determination. Also, the home tags of each port have been set by exclusively allocating a plurality of cache tags. The replacement operation at the time of a cache miss has been arranged so that it will be executed only on home tags. As a result, even if cache misses occur simultaneously in a plurality of ports, the cache tags (second pipeline) to be replaced will be different, and it will be always possible to execute the replacement operation in parallel. The cache determiner need not be stopped when a replacement operation conflict occurs. In addition, a situation in which the cache miss of a predetermined port replaces a home tag of another port will not occur.

Hence, by allocating, to each port, a necessary number of a plurality of cache tags as home tags in accordance with the use case, such as the priority order, in advance, a situation in which the cache tags are occupied by another port due to a cache conflict, such as thrashing, will not occur. As a result, the method according to this embodiment can maintain a desired system performance. If a cache tag that matches the address is discovered by comparing the addresses with the away tags of another port, it is determined that a cache hit has occurred, and the port can use the cache data stored in the cache. The aforementioned problem is solved by sharing the cache data in which a cache hit has occurred and exclusively managing the cache data in which a cache miss has occurred.

Although a description was given by a simple arrangement in the above example which used FIG. 5, the cache determiner of the multiport shared cache will be further described with reference to FIGS. 6A and 6B.

Figure 6B:
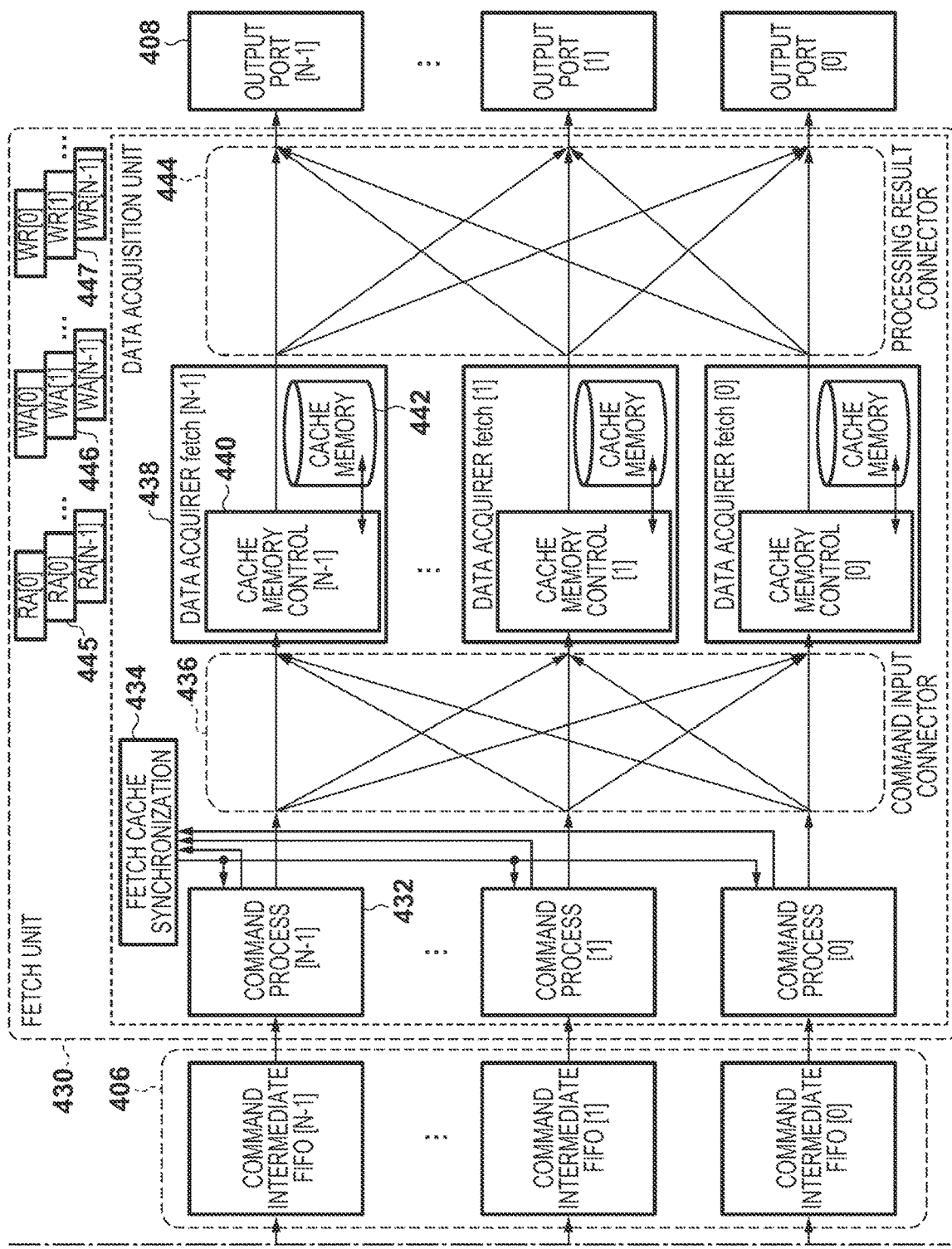

FIGS. 6A and 6B show a block diagram showing an example of the detailed arrangement of a multiport shared cache. N cache determination units [0], [1], . . . [N-1] that correspond to the N ports as shown in FIG. 6A and include cache tags divided into N groups and N final determination units [0], [1], . . . [N-1] have been arranged. At this time, each cache determination unit includes one first pipeline, one second pipeline, and N-1 third pipelines. Each final determination unit includes one home tag determination result input and N-1 away tag determination result inputs.

An address input of a predetermined port [p] is connected to a corresponding cache determination unit [p] of the first pipeline. The address input of the port [p] is input to the third pipelines of the remaining cache determination units other than the corresponding cache determination unit [p]. These address inputs can connect the N ports and the first pipe lines and the third pipe lines of the N cache determination units [0], [1], . . . [N-1] by using an address input connector.

Also, the determination result of the first pipeline of the predetermined cache determination unit [p] is input to the home tag result of a corresponding final determination unit [p]. The determination results from the third pipelines of the remaining cache determination units other than the corresponding cache determination unit [p] are input to the away tag results of the final determination unit [p]. These determination result inputs are connected by using a determination result connector. That is, the first pipe lines and the third pipe lines of the N cache determination units [0], [1], . . . [N-1] can be connected to all of the home tag results and the away tag results, respectively, of the N final determination units [0], [1], . . . [N-1].

As described above, the N ports, the N cache determination units, and the N final determination units are connected by a predetermined method by using the address input connector and the determination result connector. As a result, it is possible to perform high-speed cache determination of data requests from the N ports while sharing cache tags in this embodiment.

Note that the multiport cache sharing method can be changed by switching the connection of the above-described address input connector and the determination result connector, as a matter of course. For example, the number N of ports can be easily changed. Also, by increasing the number of cache determination units corresponding to one port from one to a plurality of cache determination units, it is possible to increase the home tags of this port.

Moreover, although the circuit arrangement described with reference to FIG. 5 can execute cache determination in parallel when the same address is input simultaneously to all of the ports, a cache miss will be determined by all of the ports. As a result, the same cache tag (tag_address) will be stored in the home tags of all of the ports, and the same data request will be issued to an external memory.

As a solution to this problem, a same address detector 412 is inserted to the input of the cache determiner of FIG. 6A. This circuit detects that the same address has been simultaneously input and will input this address to a high priority order port in accordance with a predetermined priority order of each port. For other ports, this circuit will input the address after a delay of one cycle. As a result, the address is input to the cache determiner after one cycle for other ports, and the already stored cache tags (away tags) in the high priority order port can be referred to determine a cache hit.

Unnecessary data requests to the external memory can be reduced by implementing cache sharing by the same address detector 412 when the same address is simultaneously input to a plurality of ports.

As described above, in the multiport shared cache according to this embodiment, it is possible to avoid a cache tag replacement conflict when a cache miss simultaneously occurs for a plurality of ports. Hence, it is possible to implement cache determination with little reduction in processing speed by a simple control circuit.

In addition, cache determination using counterflow pipelines has a pipeline arrangement in which data is updated by a very simple shift register, and the cache determiner can be operated at an operating frequency of a very high GHz order. Therefore, it is possible to cope with a very high memory bandwidth of a next-generation DRAM.

<6. Detailed Operation of Cache Determiner>

The method of cache determination described in FIGS. 5, 6A and 6B will be explained next in detail. In order to cope with the aforementioned multiport shared cache, the cache determiner is formed from cache determination units each performing cache tag comparison between the first pipeline, the third pipeline, and the second pipeline, and the final determination units that tally the comparison results.

The following signals are input as a comparison target address to the first pipeline of a predetermined port.

"valid" which is a valid signal of the first pipeline
"address" which is an address signal of the first pipeline
"write_enable" which is a write signal of the first pipeline
"write_data" which is a write data signal of the first pipeline
"cache_miss" which is a signal indicating a cache miss of the first pipeline At this time, assume that the initial value of "cache_miss" which is a signal indicating a cache miss is "1". Also, the same signals are input as a comparison target address to the third pipeline corresponding to each of the N-1 ports other than the above-described port. For example, in the example of FIG. 5, a three-stage pipeline has been arranged, and the address string {P, Q, R, S, . . . } has been input to the first pipeline and the address string {A, B, C, D, . . . } has been input to the third pipeline for the port [0]. Each of the A, B, C, D, P, W, R, and S is formed by the above-described address signals.

On the other hand, the following signals are input as comparison target cache tags to the second pipeline of the predetermined port.

"tag_valid" which is a valid signal of the second pipeline
"tag_address" which is a signal indicating the storage address of the cached data of the second pipeline
"modified" which is a signal indicating that the cache data has been updated by the write operation of the second pipeline
"shared" which is a signal of the second pipeline indicating that the cache tag has matched with the address of the third pipeline and has been shared from another port At this time assume that the initial values of "modified" and "shared" that indicate the state of each cache tag have been set to "0". For example, in the example of FIG. 5, a three-stage pipeline has been arranged, and a cache tag string {[9], [8], [5], [4], [1], [0]} has been input to the second pipeline for the port [0]. Each of [9], [8], [5], [4], [1], and [0] is formed by the above-described cache tag signals.

Figure 7A:
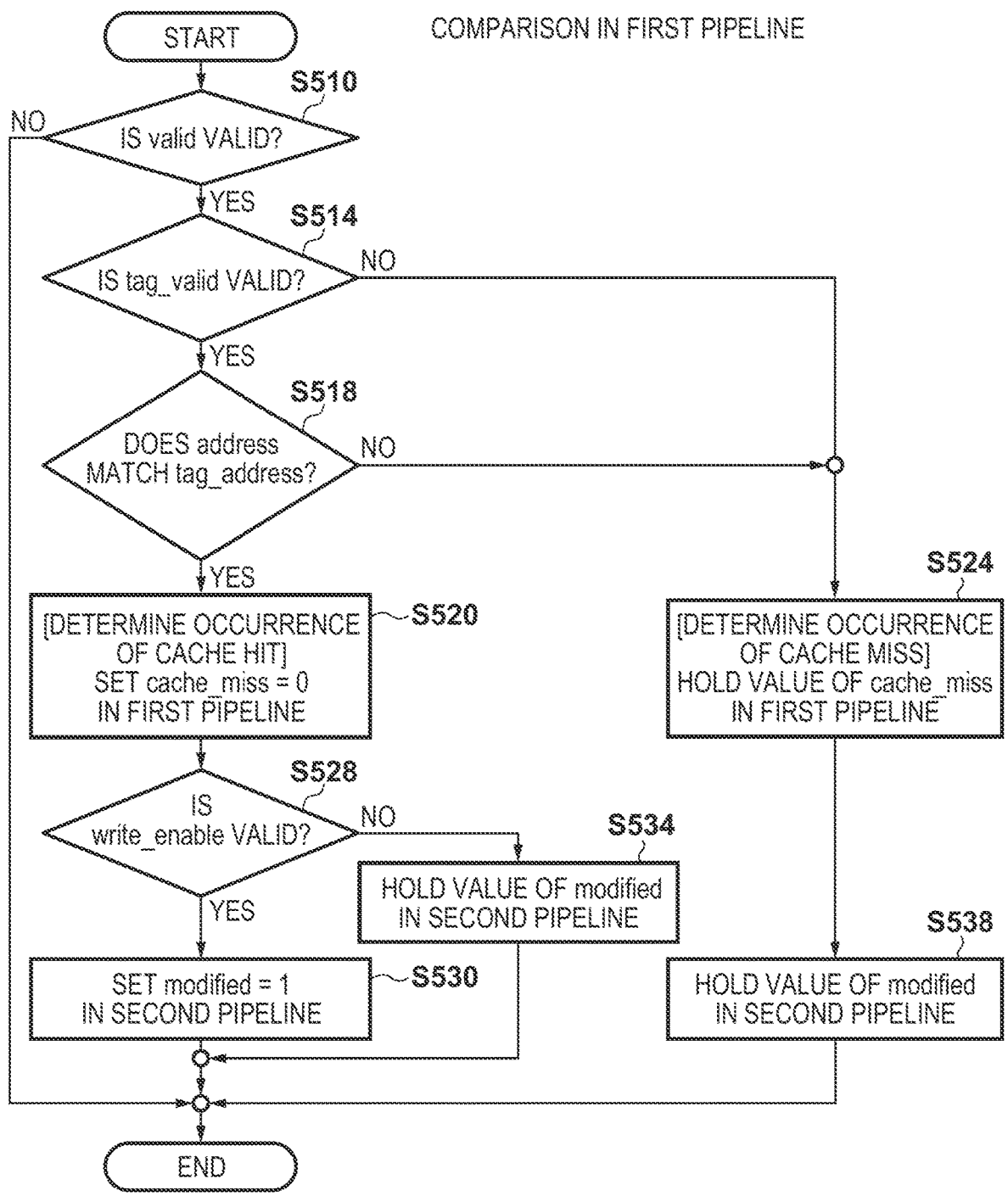
FIGS. 7A and 7B are flowcharts showing comparative operation examples of the first and third pipelines.

FIG. 7A is a flowchart showing an example of the comparison operation of the first pipeline related to cache determination. More specifically, FIG. 7A shows the operation of a cache determination unit between a home address string (first pipeline) and a cache tag string (second pipeline).

When the valid signal "valid" of a given address of the address string (first pipeline) is invalid (NO in step S510), the determination need not be performed. When the valid signal "valid" of the given address is valid (YES in step S510), all of the cache tags in the cache tag string (second pipeline) are compared.

When the valid signal "tag_valid" of a predetermined cache tag of the cache tag string (second pipeline) is invalid (NO in step S514), it is determined that a cache miss has occurred for this cache tag. Accordingly, the signal "cache_miss" of the first pipeline is held (step S524).

When the valid signal "tag_valid" of the predetermined cache tag of the cache tag string (second pipeline) is valid (YES in step S514), the address signal "address" and the cache tag address signal "tag_address" are compared. When the comparison result indicates a mismatch (NO in step S518), it is determined that a cache miss has occurred for this cache tag, and the signal "cache_miss" of the first pipeline is held (step 3524). On the other hand, when the comparison result indicates a match (YES in step S518), it is determined that a cache hit has occurred for the address and the cache tag, and the value of "cache_miss" of the first pipeline is changed to "0" (step S520).

When the signal "write_enable" of the address is valid (YES in step S528), the cache data of the cache memory is rewritten by "write_data" of the first pipeline. At this time, the value of the signal "modified" of the compared cache tag of the second pipeline is changed to "1" (step 3530). On the other hand, when the signal "write_enable" of the address is invalid (NO in step S528), the value of "modified" is held (step S534) since the cache data of the cache memory is not changed. Also, when it is determined that a cache miss has occurred for the address and the cache tag, the value of "modified" is held (step S538).

As described above, the flowchart shown in FIG. 7A can be compared in a round robin manner to all of the address strings of the first pipeline and all of the cache tag strings of the second pipeline.

Figure 7B:
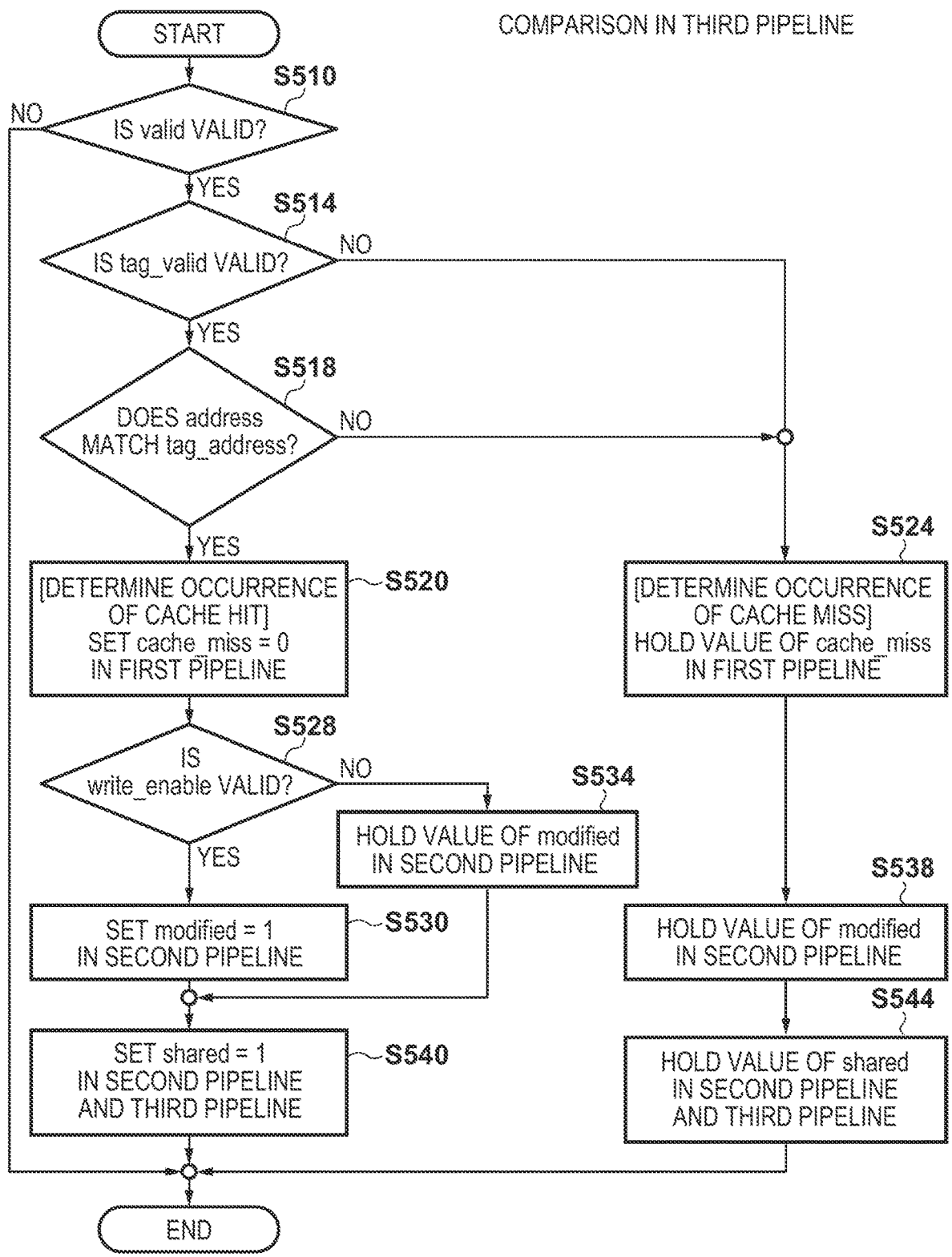

FIG. 7B is a flowchart showing an example of the comparison operation of the third pipeline related to cache determination. More specifically, FIG. 7B shows the operation of cache determination units between an address string of N−1 away address strings (third pipeline) and a cache tag string (second pipeline). Since the operations from step S510 to step S538 of FIG. 7B are the same as those of the home address strings (first pipeline), and a description thereof will be omitted.

When it is determined that cache hit has occurred for a predetermined address of the N−1 away address strings (third pipeline) and a predetermined cache tag, "shared" of the compared cache tag of the second pipeline is changed to "1" (step S540). In addition, "shared" of the third pipeline is changed to "1" (step S540). When it is determined that cache miss has occurred for the address and the cache tag, the value of "shared" of the compared cache tag of the second pipeline is held (step S544). The value of "shared" of the third pipeline is also held (step S544).

As described above, the flowchart shown in FIG. 7B can be compared in a round robin manner to all of the address strings of the third pipeline of the N−1 ports and all of the cache tag strings of the second pipeline.

After address and cache tag comparison is performed by all of the cache determination units by the above-described methods, the final determination unit of each port receives all of the comparison results of that port. Subsequently, the final cache determination result is calculated.

Figure 8:
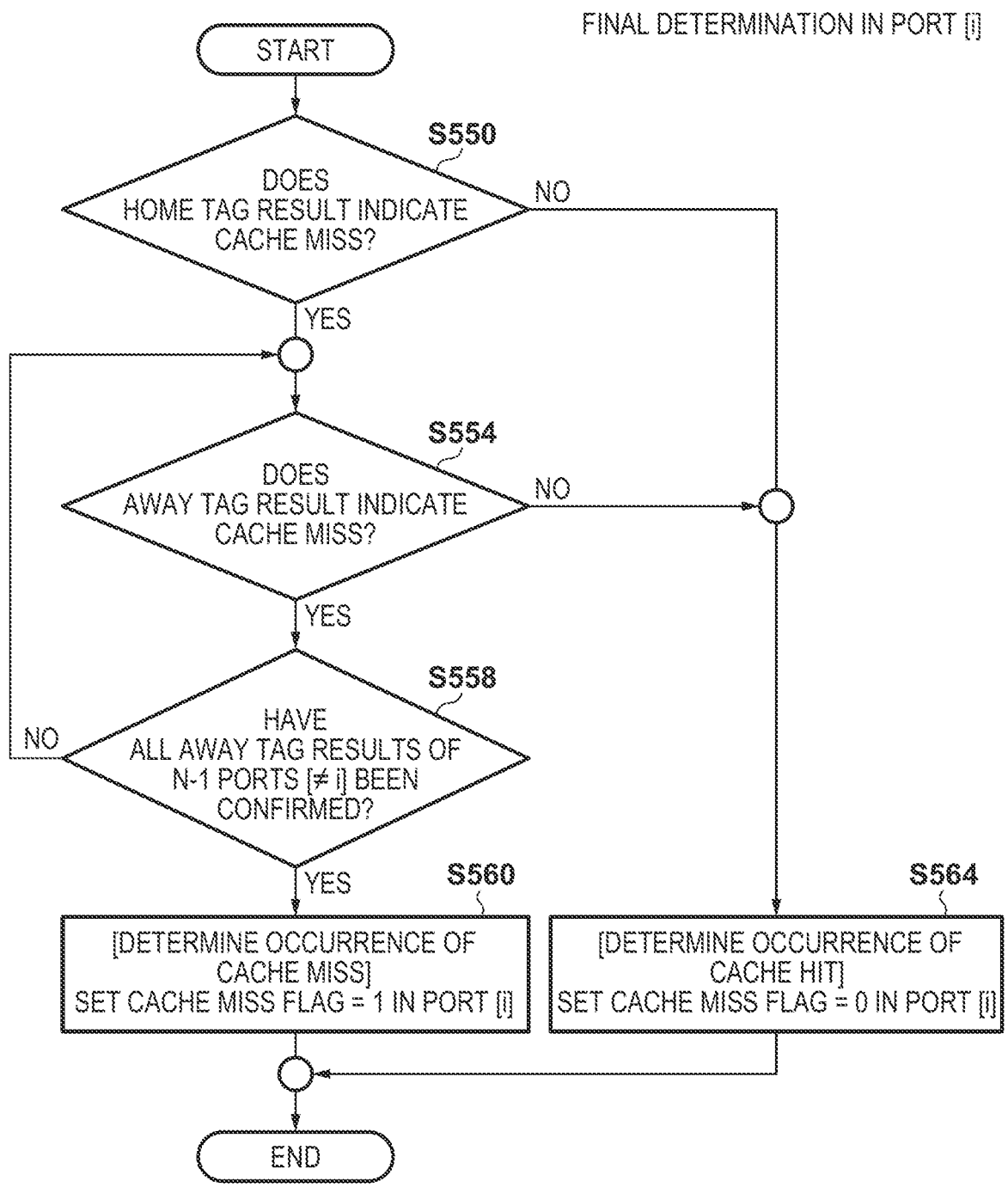
FIG. 8 is a flowchart showing an example of a final determination operation.

FIG. 8 is a flowchart showing an example of the final determination operation related to cache determination.

First, the determination result of the first pipeline which is the comparison result of each home tag of a predetermined port [i] is confirmed (step S550). When the home tag comparison result does not indicate a cache miss ("cache_miss"=0) (NO in step S550), the final determination unit determines, finally, that a cache hit has occurred in the port [i] and outputs "0" as the value of the cache miss flag. Also, when the home tag comparison result indicates a cache miss ("cache_miss"=1) (YES in step S550), the final determination unit confirms the comparison results with the away tags of other N−1 ports, excluding the port [i]. The final determination unit selects one port among the other N−1 ports and confirms the determination result of the third pipeline which is the comparison result of the away tags (step S554).

When the away tag comparison result does not indicate a cache miss ("cache_miss"=0) (NO in step S554), the final determination unit determines, finally, that a cache hit has occurred in the port [i] and outputs "0" as the value of the cache miss flag. When the away tag comparison result indicates a cache miss ("cache_miss"=1) (YES in step S554) and if all of the other N−1 ports have not been confirmed (NO in step S558), the next port is selected from the other N−1 ports. When all of the comparison results indicate a cache miss ("cache_miss"=1) after all of the other N−1 ports have been confirmed (YES in step S558), the final determination unit determines, finally, that a cache miss has occurred in the port [i]. The final determination unit outputs "1" as the value of the cache miss flag.

When a cache miss occurs, the cache tags of the second pipeline are eventually swept. If the cache data of each cache tag to be swept has been rewritten by a write operation, the cache data will need to be written back since the data will differ from the data in the external memory. The occurrence of the rewriting operation is determined when the signal "modified" of the second pipeline is "1", and a write back flag indicating the execution of a write back operation is changed to "1". Subsequently, the tag_address stored in each swept cache tag is set as the write back address that serves as the storage destination in the external memory. The cache determiner synchronizes with the determination result of the first pipeline and outputs a signal related to the write back operation of the second pipeline.

From the above processes, the following signals that serve as the determination results are output from the final determination unit based on the input address.

"valid data (valid)" which is a valid signal of the first pipeline

"address" which is an address signal of the first pipeline

"write operation (write_enable)" which is a write signal of the first pipeline

"write data (write_data)" which is a write data signal of the first pipeline

"cache miss flag (cache_miss_flag)" which is a signal indicating a cache miss of the first pipeline "line number (tag_id)" which is a signal indicating the storage destination of the cache data of the first pipeline "synchronization point (shared)" which is a signal indicating that the cache data of the third pipeline has been shared "valid cache tag (tag_valid)" which is a signal indicating the sweeping of the cache tag of the second pipeline "write back address (tag_address)" which is a signal indicating the write back destination from the sweeping operation of the cache tags of the second pipeline "write back flag (modified)" which is a signal indicating that a write back operation is to be performed due to the sweeping of the cache tags of the second pipeline Note that the cache determiner that includes cache determination units 416 and final determination units 420 is provided as a prefetch unit (device/circuit/logic) corresponding to the data acquisition unit (to be described later). The cache determiner connects to a preceding pipeline stage with respect to a predetermined pipeline stage that requires data and corresponds to preprocessing for the predetermined pipeline stage.

As described above, in the multiport shared cache, high-speed cache miss determination with respect to a plurality of ports can be performed by a pipeline operation. It is possible to detect whether the cache tag strings (second pipeline) shared from the N multiports are in a shared state or in a rewritten state, in accordance with the cache determination.

<7. Cache Memory>
<7.1. Maintenance of Consistency and Maintenance of Coherency>

Generally, in cache sharing by a plurality of masters, a cache memory rewriting destination acquired from a cache miss of a predetermined port may be read out as a cache hit by another port. In this case, it becomes necessary to correctly consider which cache memory access has occurred first and to correctly execute a cache sharing operation. The maintenance of the correct operation of a data write operation to a cache memory such as the write back operation is called "maintenance of consistency". On the other hand, the maintenance of the correct operation of a cache memory update operation at the time of a cache miss is called "maintenance of coherency". It is also necessary to implement, in the multiport shared cache according to this embodiment, the "maintenance of consistency" and the "maintenance of coherency" to the plurality of data requests that simultaneously occurs from the multiports.

A detailed operation will be described for these problems with reference to FIG. 6A hereinafter. Note that the cache determination performed by the cache determination units and the final determination units is the same as that described above. Since processes from the input ports to the final determination units operate in parallel at the same speed, the data requests from the N ports basically are processed in a chronological order at approximately the correct time. Hence, in this embodiment, the data requests from all of the ports are synchronized based on the cache determination results from the final determination units of the N ports.

More specifically, information (a synchronization pointer and a time stamp) is added to manage synchronization in the cache synchronization (prefetch cache synchronization 422) in a prefetch unit 410 of FIG. 6A. In this embodiment, the cache determination results of all of the ports are referred to, and if a cache miss or a write operation has occurred in one port, the value of the synchronization pointer is incremented by 1. Also, if the cache determination results of all of the ports indicate a cache hit, and only the read operation to the cache memory has occurred, the numeric value of the synchronization need not be changed since the cache memory states of all of the N ports do not change. The prefetch cache synchronization 422 adds the value of the calculated synchronization pointer to the cache determination result of each port.

At this time, the time at which the value of the synchronization pointer changes is set as the synchronization point, and the data requests of the N ports are synchronized before and after this synchronization point so that the data request order is observed before and after the synchronization point. The cache memory control synchronization operation using the synchronization pointer will be described later in the detailed description of a cache fetch unit 430.

The less the number of synchronization points is and the longer the interval between a synchronization point and a successive synchronization point in a time series are, the performance can improve easily since there is less waiting periods due to synchronization. Hence, it is preferable for the calculation of the synchronization pointer of the prefetch cache synchronization 422 to be made more precise. A cache-missed address of a predetermined port does not require a synchronization operation since it is unrelated if the addresses of the data requests of the predetermined port and the remaining ports are different. For example, in a case in which the signal "shared" of the cache determination result is valid, the cache updates due to cache misses and write operations of data requests from other ports until that point have been referred to, and thus the value of the synchronization pointer is incremented by 1.

The prefetch unit 410 sets the synchronization pointer and the cache determination result of each port output from the prefetch cache synchronization 422 as one command for each port and transmits a command to each of command intermediate FIFOs [0] to [N−1] of the N ports.

The fetch unit 430 that manages the cache data while controlling the cache memory will be described next. The fetch unit 430 includes command processes [0] to [N−1] in the N ports, respectively, and all of the command processes are connected to fetch cache synchronization 434. The same system synchronization pointer is input to each command process from the fetch cache synchronization 434.

Figure 9:
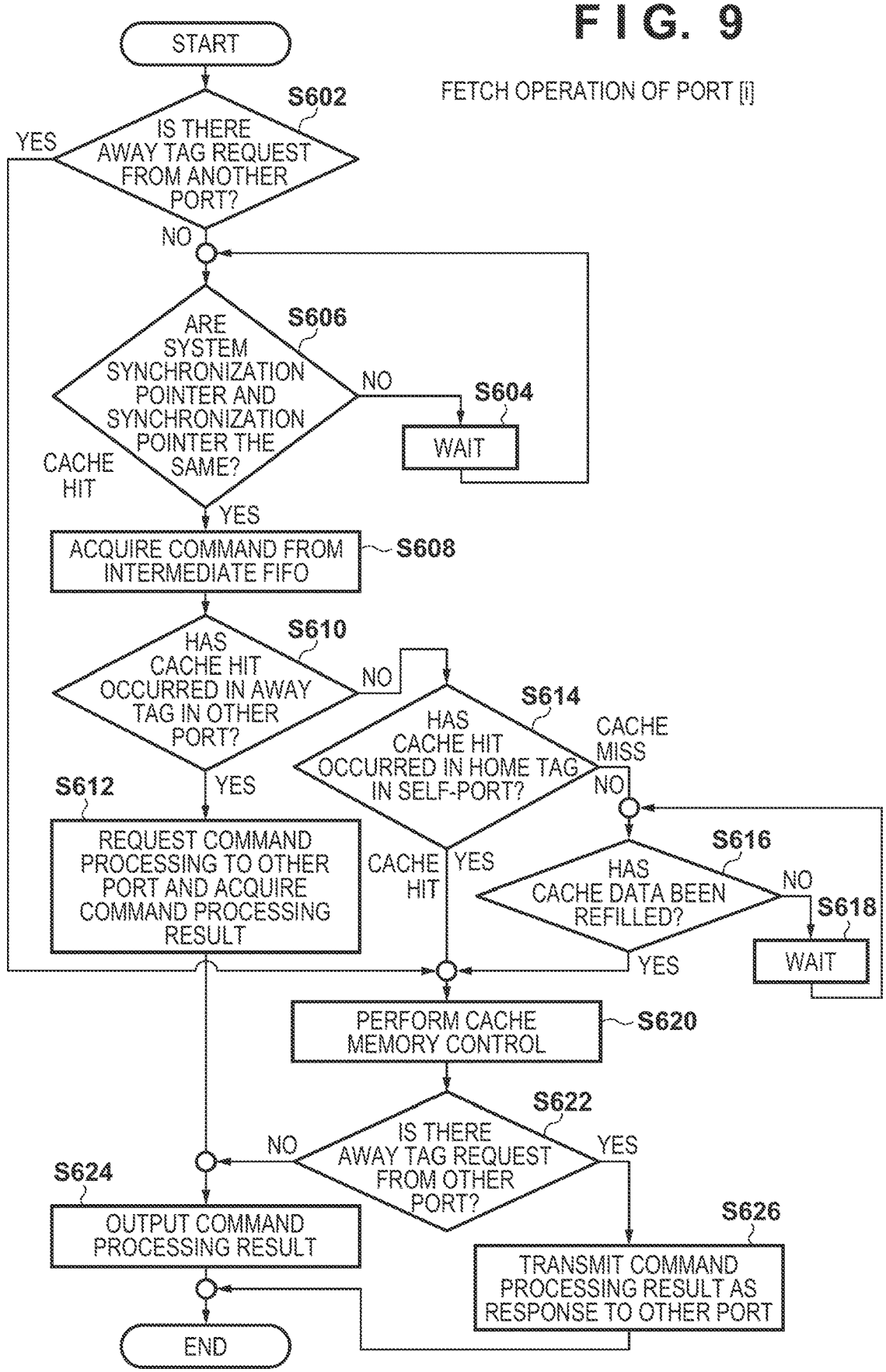
FIG. 9 is a flowchart showing an example of a fetch operation.

FIG. 9 is a flowchart showing an example of a fetch operation of the multiport shared cache. The operation of each of command processes 432 described above will be described in detail with reference to FIG. 9.

The port [i] checks whether there is an away tag request from another port. If there is a request from the other port (YES in step S602), the port [i] does not perform the command process of its self-port (port [i]) and prioritizes the execution of cache memory control processing of the other port. The port [i] performs cache memory control (step S620) to the request from the other port, and transmits, for the away tag request from the other port (YES in step S622), the command process result of the requesting other port as a response (step S626).

If no request is transmitted from the other port (NO in step S602), the port [i] performs the command process of the self-port. More specifically, the port [i] compares the system synchronization pointer from the aforementioned fetch cache synchronization 434 and the synchronization pointer of the command held in the intermediate FIFO. If the system synchronization pointer and the synchronization pointer of the predetermined port [i] are not the same (NO in step S606), the port [i] will wait since cache synchronization is required (step S604).

If the system synchronization pointer and the synchronization pointer of the predetermined port [i] are the same (YES in step S606), the command process 432 acquires the command from the intermediate FIFO (step S608).

Next, if the cache hit that occurred in the self-port [i] is a cache hit that occurred in an away tag of another port and the cache data is to be read out from the cache memory of the other port (step S610), the port [i] transmits a command process request to the other port. Then, the port [i] acquires the command process result from the other port (step S612). Subsequently, the command process of the self-port [i] outputs the acquired command process result (step S624).

If the cache hit that occurred in the self-port [i] is not a cache hit that occurred in an away tag of another port (NO in step S610), the port [i] determines whether the cache hit is a cache hit or a cache miss that occurred in a home tag in the self-port [i]. Hence, when a cache hit is determined (YES in step S614), the command process of the port [i] performs cache memory control (step S620) and outputs the result as a command process result (step S624).

When the command process of the port [i] is determined that a cache miss has occurred (NO in step S614), the port [i] determines whether the cache data has been refilled (to be described later) (step S616). If it has not been refilled (NO in step S616), the port [i] waits (step S618). Otherwise (YES in step S616), the port [i] performs cache memory control (step S620). Subsequently, the command process of the port [i] outputs the result as the command process result (step S624).

The above-described cache memory control (step S620) is performed in all of cache memory controls [0] to [N−1] in FIG. 6B. The command process request from each port to another port described above is performed by a command input connector 436 in FIG. 6B. In addition, the acquisition of the command process result from another port to each port is performed by a process result connector 444 in FIG. 6B.

<7.2. Access Arbitration Unit>

An access arbitration unit that arbitrates each data request from the aforementioned prefetch unit 410 and the fetch unit 430 and issues a data request to the system bus (Network On Chip/shared bus) will be described with reference to FIG. 10A.

Figure 10A:
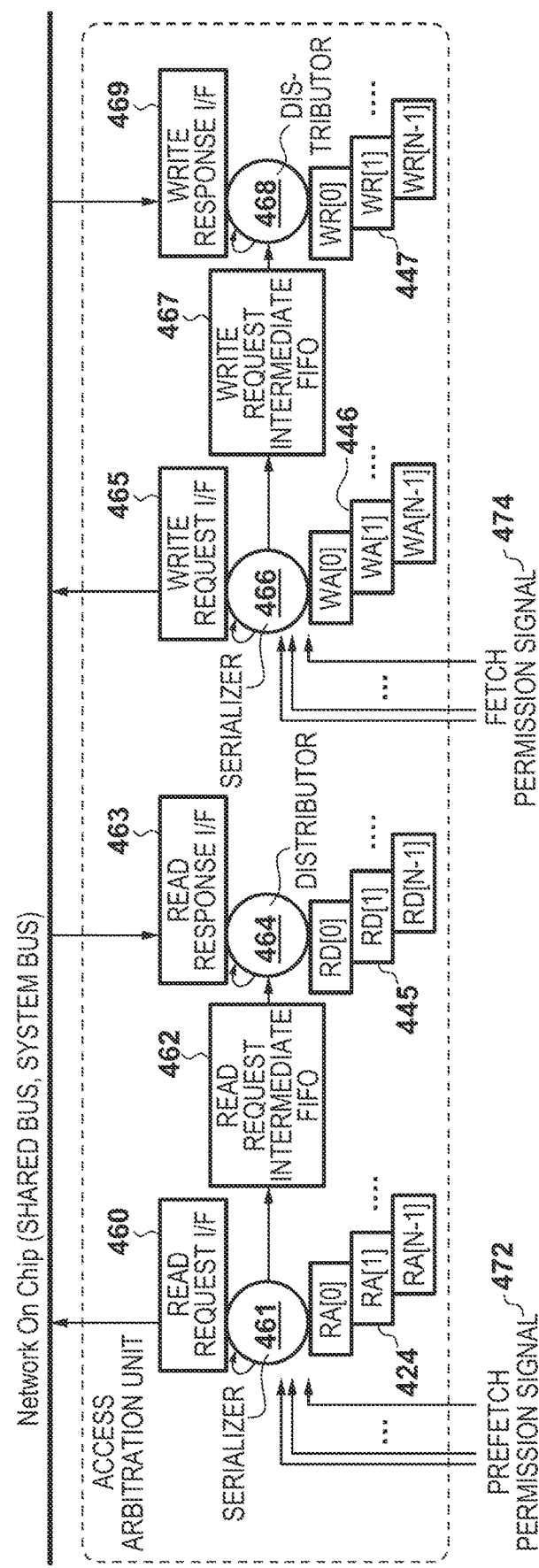
FIGS. 10A and 10B are block diagrams showing examples of the detailed arrangements of an access arbitration unit and a data acquisition unit.

FIG. 10A is a block diagram showing an example of the detailed arrangement of the access arbitration unit of a multiport shared cache. When a cache miss is determined for one of the ports, the prefetch unit 410 transmits a data request to the system bus. At this time, the prefetch unit 410 writes the read address of the cache-missed port to read address registers RA [0] to RA [N−1].

The access arbitration unit evaluates the state of a prefetch permission signal 472 transmitted from each of data acquirers 438. A serializer 461 confirms, for the read address of each port, the corresponding prefetch permission signal 472. When the state of prefetch permission signal 472 is "permitted", the serializer writes the read address in a read request I/F 460 and transmits a data read request to the system bus. The serializer holds information such as the read-requested port number in a read request intermediate FIFO 462 until a read response corresponding to the read request is returned from the system to a read response I/F 463. When the read response is returned, a distributor 464 reads out the read data from the read response I/F 463. The distributor 464 reads out the read-requested port number from the read request intermediate FIFO 462. Subsequently, the distributor 464 writes the readout port number to one of read data registers RD [0] to RD [N−1] in the fetch unit 430.

The fetch unit 430 can receive a read response to a transmitted read request by such an operation.

Since the access arbitration unit can hold information such as a plurality of port numbers in the read request intermediate FIFO 462, a plurality of read requests can be issued in advance to the system bus by a non-blocking operation until one read response is returned.

Also, when the state of the prefetch permission signal 472 of a predetermined port is not "permitted", the serializer 461 searches for another port in which the state of its prefetch permission signal 472 is "permitted" and issues a read request. The serializer 461 waits until the state of the prefetch permission signal 472 changes to "permitted" for each port whose prefetch permission signal does not indicate that it is "permitted".

The prefetch unit 410 is stopped (stalled) until all of the read requests of the read data registers RD [0] to RD [N−1] are read. Note that if the read data registers RD [0] to RD [N−1] are implemented by a FIFO, the performance can be improved since the prefetch unit 410 need not be stopped until the FIFO is full.

In each multiport shared cache according to this embodiment, in order to cope with a write back operation, the fetch unit 430 transmits a write request to the system bus to write the cache memory data in an external memory at the time of a write back operation. The fetch unit 430 writes, in relation to a port that requires a write request, the write address and the write data in one of corresponding write address registers WA [0] to WA [N−1]. Although the access arbitration unit makes a read request by confirming the state of the prefetch permission signal 472 at the time of a read request, the access arbitration unit makes a write request by confirming the state of a fetch permission signal 474 at the time of a write request. The operation of the write request of the access arbitration unit is basically the same as the operation of the above-described read request. The access arbitration unit uses write address registers 446, a serializer 466, a write request I/F 465, a write request intermediate FIFO 467, a write response I/F 469, and write response registers 447 to implement the write request operation in the same manner as the read request operation.

<7.3. Data Acquisition Unit>

Figure 10B:
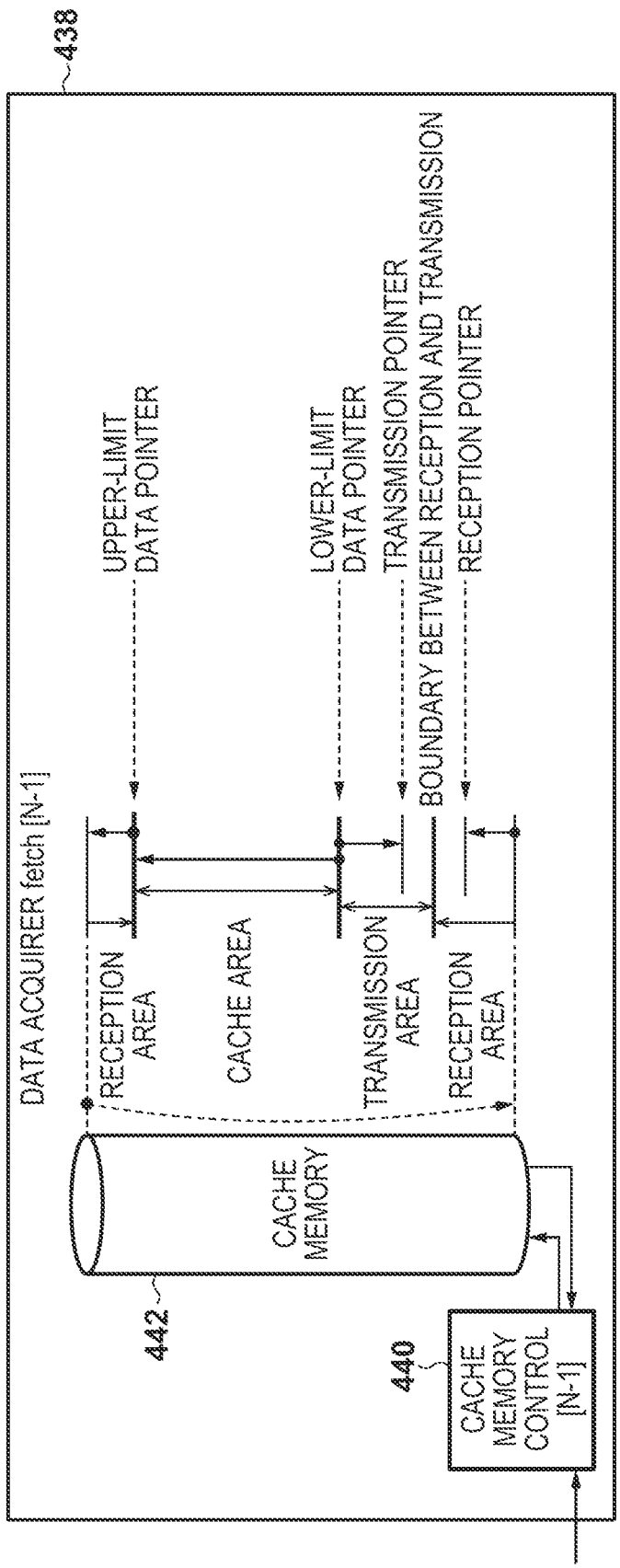

FIG. 10B is a block diagram showing an example of the detailed arrangement of data acquisition unit of a multiport shared cache. The operation of the data acquirer 438 of each port, including each cache memory control 440 and each cache memory 442 will be described in detail with reference to FIGS. 6A, 6B, 10B, 11A, and 11B. As shown in FIG. 6B, the fetch unit 430 includes N data acquirers fetch [0] to fetch [N−1] in correspondence with the N ports.

Each cache memory 442 according to this embodiment is formed by logically including a "cache area", a "reception area", and a "transmission area" as shown in FIG. 10B.

Each cache memory control 440 includes information (a reception pointer) to manage the reception area, information (a transmission pointer) to manage the transmission area, and information (a lower-limit data pointer and an upper-limit data pointer) to manage the cache area.

Figure 11A:
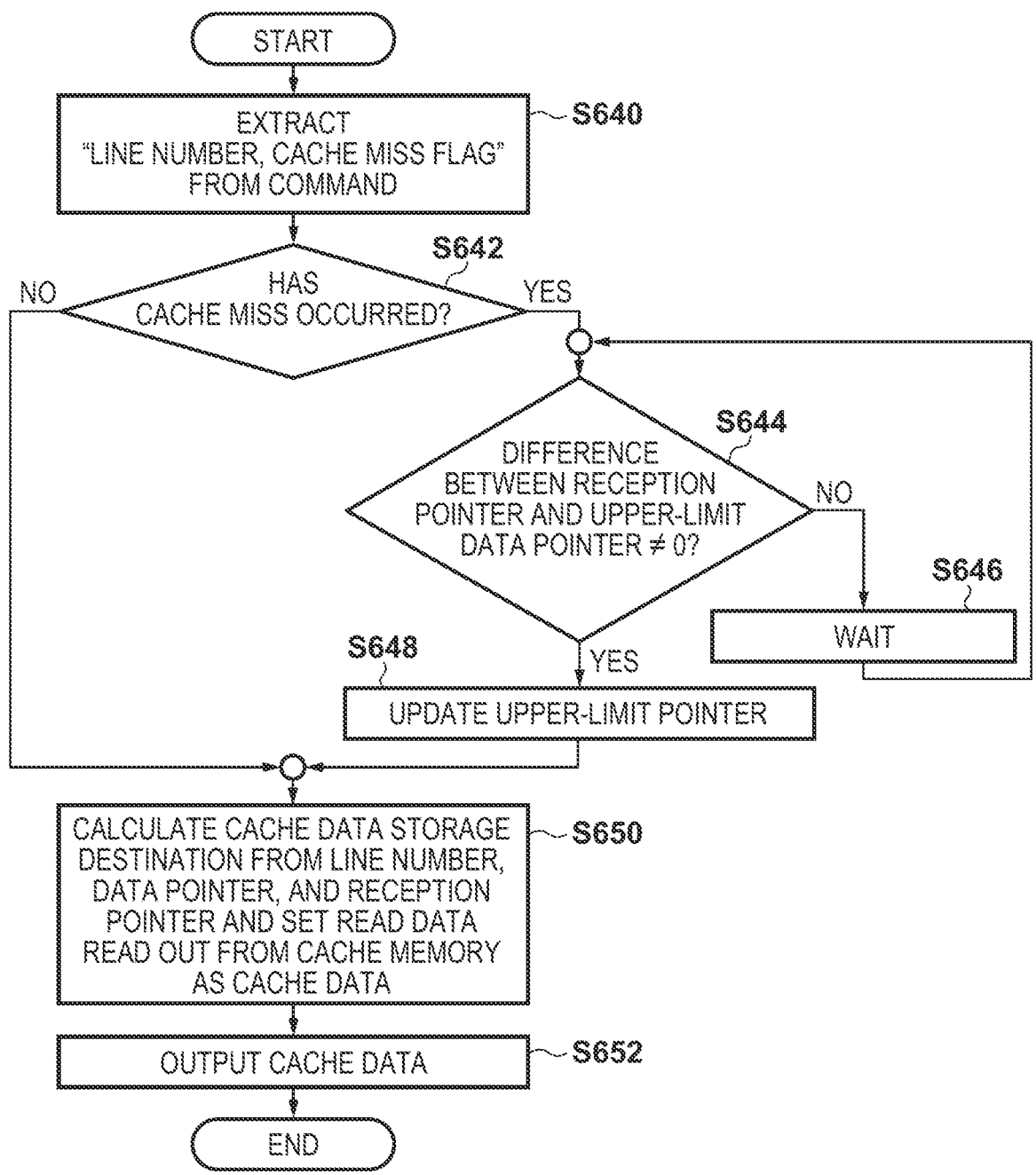
FIGS. 11A and 11B are flowcharts that show examples of a read cache operation and a refill operation.
Figure 11B:
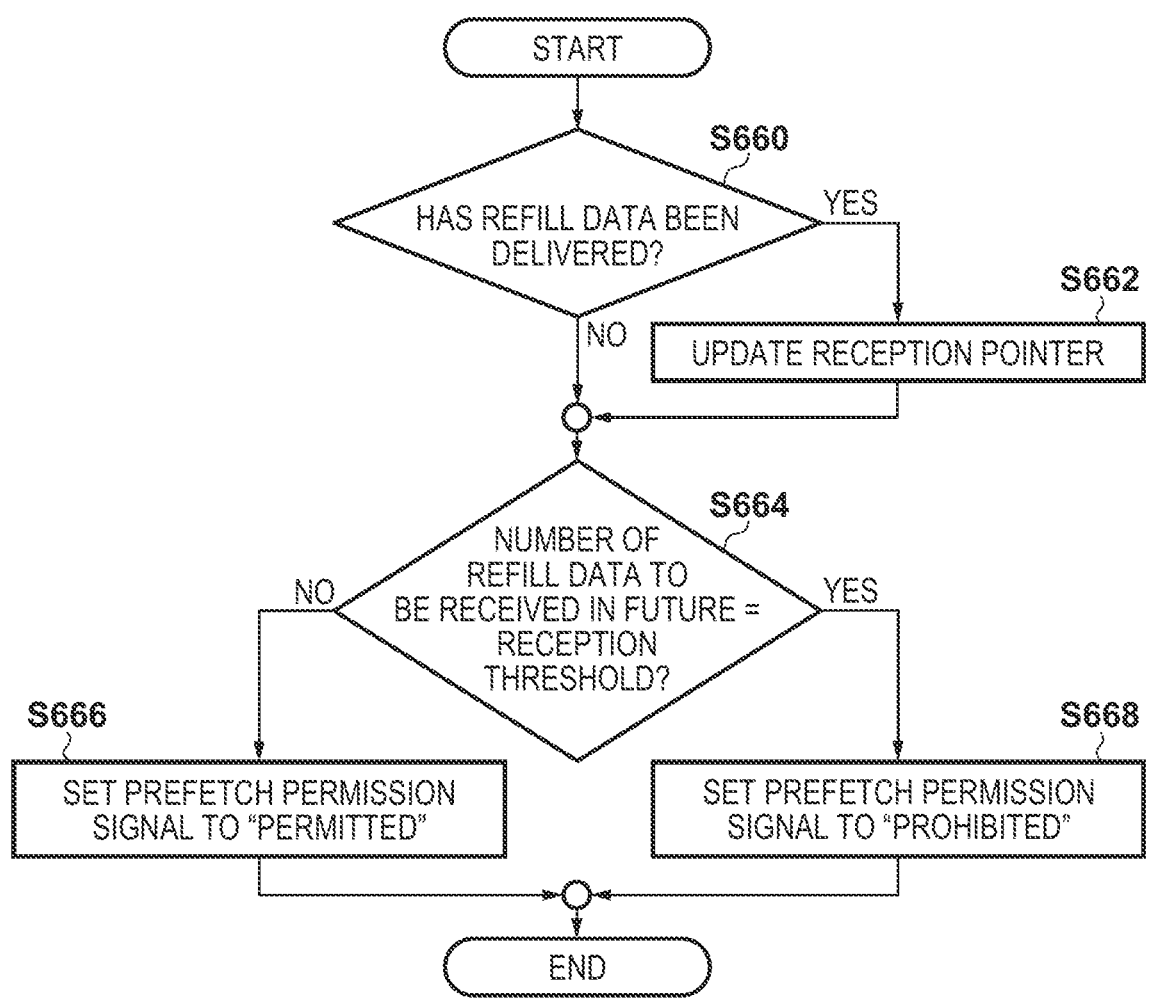

FIG. 11A is a flowchart showing an example of a read cache operation of each cache memory control. FIG. 11B is a flowchart for showing an example of a refill operation of the cache memory control. First, the read cache and refill operations will be described in detail.

The cache memory control 440 retrieves the "line number and the cache miss flag" from the cache determination result (step S640). The cache memory control performs the next cache data acquisition operation in accordance with the value of the cache miss flag which is the evaluation result.

FIG. 11A shows an example of the cache data acquisition operation.

If the cache miss flag is invalid (a cache hit) (NO in step S642), the cache memory control 440 calculates a storage address on the cache memory 442 from the line number, the reception pointer of the cache memory 442, and the upper-limit data pointer. The cache memory control reads out the stored data as the read data from the cache memory 442 based on this storage address (step S650). Subsequently, the cache memory control outputs the requested cache data (step S652).

If the cache miss flag is valid (a cache miss) (YES in step S642), the cache memory control 440 confirms the difference between the reception pointer and the upper-limit data pointer (step S644). If there is no difference (the value is 0) between the two pointers (NO in step S644), it is evaluated that the refill data requested from an external memory has not been delivered to the cache memory 442, and the cache memory control waits for the refill data to be delivered (step S646). If there is a difference (the value is not 0) between the two pointers (YES in step S644), the upper-limit data pointer is updated since the refill data requested from the external memory is already stored in the cache memory 442 (step S648). The procedure performed from this process to the cache data output process is the same as the above-described procedure performed when the cache miss flag is invalid (a cache hit).

The data acquisition unit performs the reception operation of the requested refill data in parallel with the aforementioned cache data acquisition operation. FIG. 11B shows an example of the refill data reception operation of the data acquisition unit. When refill data that is requested from the external memory is delivered to the data acquisition unit (YES in step S660), the data acquisition unit updates the reception pointer (step S662). Next, the data acquisition unit confirms the difference between the reception pointer and the upper-limit data pointer (step S664). If the difference between the two pointers is equal to a predetermined reception threshold (YES in step S664), the prefetch permission signal 472 is changed to "prohibited" (step S668) since no more sets of refill data can be received. If the difference between the two pointers is smaller than the predetermined reception threshold (NO in step S664), the prefetch permission signal 472 can remain "permitted" (step S666) since the refill data can be received from the external memory.

In circuit implementation, the prefetch unit 410 is preceded by the fetch unit 430. Hence, in some cases, it may be too late if a data request to the DRAM is stopped in the access arbitration unit after the prefetch permission signal is received from the fetch unit 430. Considering the differences in latency from such circuit positional relationships, the above-described reception threshold can be set smaller than the number of reception stages that can be stored in advance. Alternatively, as a more precise method, a refill wait count may be newly defined, and the prefetch permission signal 472 may be generated by using this refill wait count. The refill wait count starts from 0, 1 is added for each cache miss in the access arbitration unit, and 1 is subtracted each time refill data arrives at the data acquisition unit. That is, the refill wait count represents the number of sets of refill data that has not reached the fetch unit although the data request has been made. The total value of the received refill data count (the difference between the reception pointer and the upper-limit data pointer) and the refill wait count is the number of sets of refill data to be received in the future. If this number to be received in the future is smaller than the reception threshold, the prefetch permission signal 472 is set to "permitted". If the number to be received in the future is the same number as the reception threshold, the prefetch permission signal 472 is set to "prohibited". At this time, no more sets of refill data can be received since the reception count and the reception threshold will be the same value. The cache area would need to be overwritten if any more sets of refill data are to be received. Therefore, the data acquirer 438 changes the prefetch permission signal 472 to "prohibited", notifies the access arbitration unit of the prohibition, and temporarily stops the non-blocking access. The prefetch unit stops the data request to an external memory.

Figure 12A:
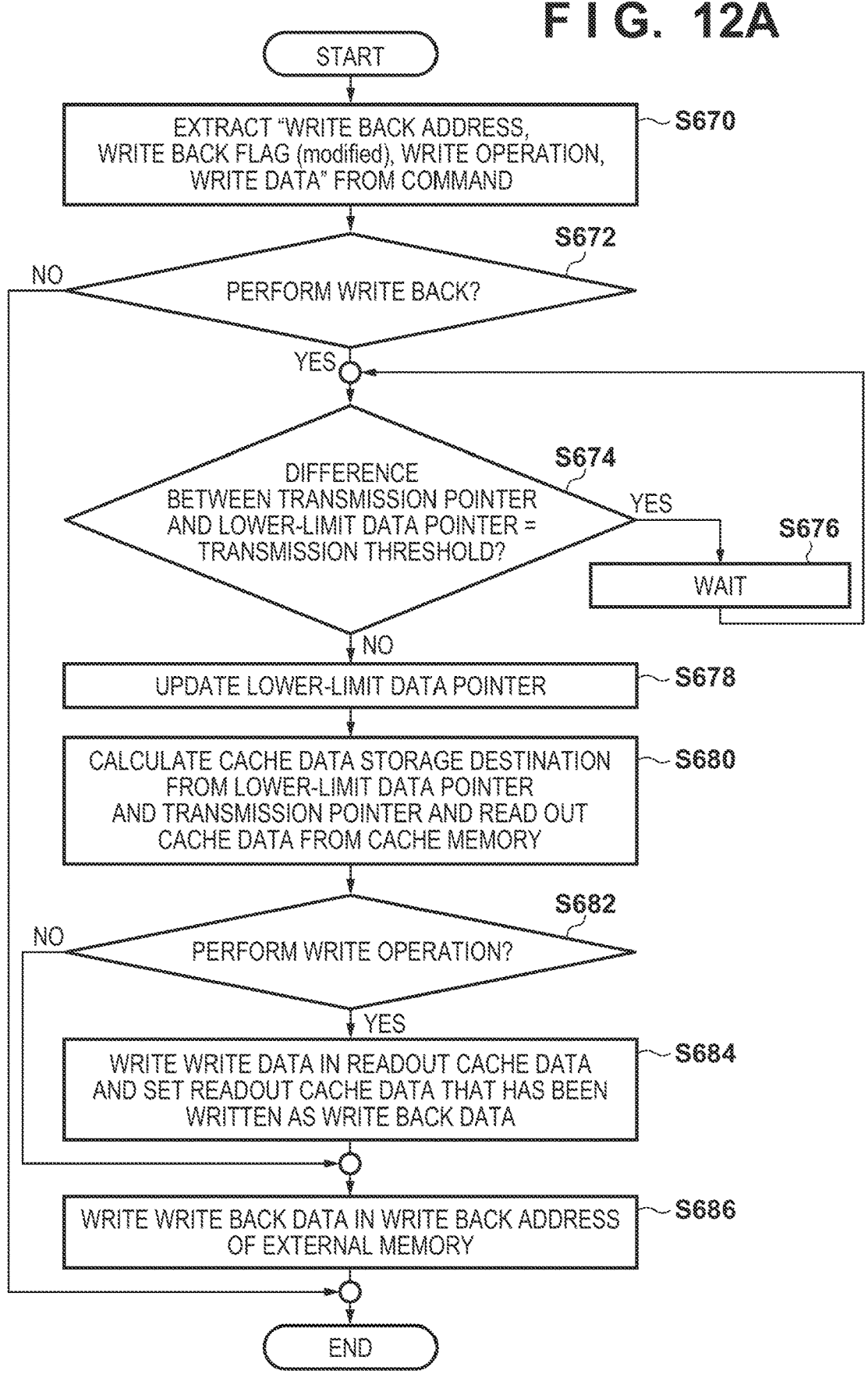
FIGS. 12A and 12B are flowcharts showing examples of a write back cache operation and a write response operation.

FIG. 12A is a flowchart showing an example of a write back cache operation of cache memory control. The write back operation of a write back cache will be described in detail with reference to FIG. 12A.

The cache memory control 440 extracts the "write back address, write back flag (modified)" of the cache determination result (step S670). The cache memory control then performs the next cache data write operation in accordance with the value of the write back flag which is the evaluation result. An example of the cache data write operation is shown in FIG. 12A.

When the write back flag is invalid (NO in step S672), the cache memory control 440 does not perform the write back operation. On the other hand, when the write back flag is valid (write back) (YES in step S672), the cache memory control 440 confirms the difference between the transmission pointer and the lower-limit data pointer (step S674). If the difference between the two pointers is the same value as that of a transmission threshold (YES in step S674), the transmission area is full since the write responses to the write requests that have been issued have not been returned. In this case, the cache memory control 440 will stop issuing the write request since no more sets of cache data can be held in the write request transmission area. The cache memory control 440 waits until the transmission area is released and the difference between the two pointers is smaller than the transmission threshold (step S676).

On the other hand, if the difference between the two pointers is smaller than the transmission threshold (NO in step S674), a write request can be transmitted to an external memory, and the lower-limit data pointer is updated (step S678). The cache memory control 440 calculates a storage address on the cache memory 442 from the transmission pointer of the cache memory 442 and the lower-limit data pointer. More specifically, an area that has switched from the cache area to the transmission area by the updating of the lower-limit data pointer has the storage address. The cache memory control 440 reads out the stored data as the cache data from the cache memory 442 based on the storage address (step S680).

If the command that is being processed does not indicate a write operation (NO in step S682), the cache memory control 440 sets the readout cache data as "cache back data". On the other hand, if the command that is being processed indicates a write operation (YES in step S682), the cache memory control 440 writes the write data of the command in the readout cache data and sets the resultant data as "write back data" (step S684). Note that if the data amount of the cache data and the data length of the write data are the same, the cache memory control 440 can omit the cache data readout process (step S680) since the write data will directly become the write back data. On the other hand, if the write data is smaller than the cache data, only a part of the cache data will be overwritten by the write back data by the cache memory control 440. The cache memory control 440 writes the calculated write back data at the write back address of an external memory (step S686).

Figure 12B:
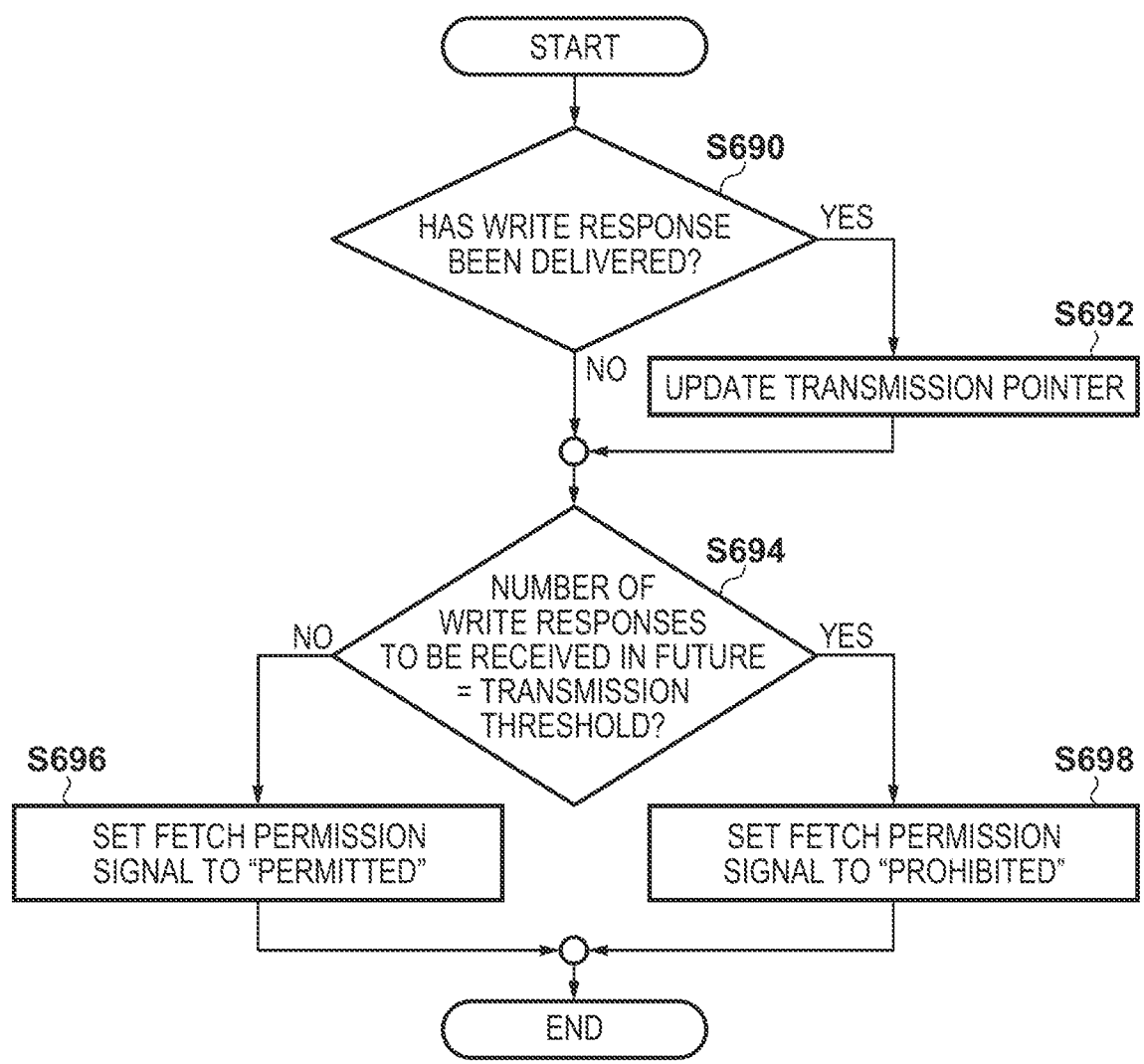

FIG. 12B is a flowchart showing an example of a write response operation of the cache memory control. In the data acquisition unit, a write response reception operation to a write request is performed in parallel to the aforementioned write back data write operation.

When a requested write response is delivered from an external memory to a data acquirer (YES in step S690), the transmission pointer is updated (step S692). Next, the data acquirer confirms the difference between the transmission pointer and the lower-limit data pointer (step S694). If the difference between the two pointers is the same number as the predetermined threshold value (YES in step S694), the data acquirer changes the fetch permission signal 474 to "prohibited" since no more sets of transmitted cache data can be held (step S698). If the difference between the two pointers is smaller than the predetermined transmission threshold (NO in step S694), the fetch permission signal 474 can remain in the state of "permitted" since the transmitted cache data can be held in the external memory (step S696).

The concept of the fetch permission signal 474 at the time of a write back operation can be basically the same as that of the prefetch permission signal 472 at the time of a refill operation. As a more precise method, for example, a transmission count may be defined, and this transmission count may be used to generate the fetch permission signal 474. The newly defined transmission count starts from "0", 1 is added for each write back operation in the access arbitration unit, and 1 is subtracted each time a write response arrives at the data acquirer. That is, the transmission count represents the number of write responses that has been write-requested but has not been returned to the fetch unit. The total value of the received write response count (the difference between the transmission pointer and the lower-limit data pointer) and the transmission count is the number of write responses to be received in the future.

If this number to be received in the future is smaller than the transmission threshold, the fetch permission signal 474 is set to "permitted". If the number to be received in the future is the same number as the transmission threshold, the fetch permission signal 474 is set to "prohibited". At this time, no more write back operation can be performed since the number to be received in the future and the transmission threshold are the same value. If the write back operation is performed any further, the transmission area will exceed the boundary between reception and transmission, and the reception area will be overwritten. Therefore, the data acquirer 438 changes the fetch permission signal 474 to "prohibited", notifies the access arbitration unit of the prohibition, and temporarily stops the non-blocking access. The fetch unit stops the data request to the external memory.

As described above, the data acquisition unit is arranged as a fetch unit (device/circuit/logic) to acquire requested data, and the acquired data is supplied to a predetermined pipeline stage.

Note that in the above description, the cache memory control 440 sets the reception area and the transmission area to predetermined capacities by setting the reception threshold and the transmission threshold in advance. In contrast, it can be arranged so that the total amount of the reception area and the transmission area is set to a predetermined capacity and the cache memory control 440 can dynamically change the "boundary between reception and transmission" in FIG. 10B. This allows the cache memory control 440 to relieve pipeline stops that are caused by the lack of the aforementioned reception area and the transmission area.

For example, consider a case in which the reception pointer of the cache memory control 440 has reached the "boundary between reception and transmission" but the transmission pointer has not reached the "boundary between reception and transmission". In this case, although the pipeline was stopped in the aforementioned method, if a read request is issued, the "boundary of reception and transmission" is relaxed to the position of the transmission pointer by the cache memory control 440. The cache memory control 440 can temporarily increase the reception threshold, change the prefetch permission signal 472 from "prohibited" to "permitted", and issue a read request without stopping. When there is a lack of transmission area, the "boundary of reception and transmission" can be, on the other hand, relaxed to the position of the reception pointer by the cache memory control 440.

As described above, in this embodiment, the transmission area is provided in the cache memory and the write back data (cache data) that is being transmitted (written) is held until a write response to the write request is returned from the system. Hence, the embodiment can cope with a case in which a data write operation fails due to an error on the side of the system. More specifically, when a write response indicating an error state is returned from the system, the cache memory control 440 will determine that the system has failed in the write operation. The cache memory control 440 can, without updating the transmission pointer, transmit (write) again the write back data indicated by the transmission pointer.

<Effect>

As described above, the cache unit according to the first embodiment implements a fully associative-type cache device that performs a non-blocking operation by a very simple mechanism as described above. Also, the cache unit is also characterized in that the reception area and the transmission area are allocated to a part of the cache memory area of this embodiment, and data reception, data transmission, and data hold are integrated in a single storage area. By integrating the data reception area, the data transmission area, and the data hold area on the cache memory, it is possible to flexibly change capacities and to implement a suitable structure change in accordance with various kinds of operations of image processing.

The cache memory use method according to this embodiment matches the FIFO (round-robin) replacement method that is generally adopted in a fully associative-type cache device. Hence, the fully associative-type cache device can be preferably implemented.

Furthermore, the method according to this embodiment can implement, by the synchronization pointer function, the "maintenance of consistency" and the "maintenance of coherency" to a plurality of ports in a multiport shared cache. Also, by cache memory control and cache memory modification, the DRAM access latency can be concealed by a non-blocking operation for both the read cache and the write cache. As a result, the data processing throughput can be improved.

In addition, by changing the cache line length (refill length) forming the cache memory, the transfer length for each memory access can be controlled to implement suitable data transfer in accordance with the DRAM specification.

Second Embodiment

In the first embodiment described above, the DRAM 110, the eDRAM 120, the stacked memory 130, or the like was set as the external memory to describe a memory access method from a multiport shared cache.

In the second embodiment, a DRAM 110 and a stacked memory 130 are set as the external memories. Each eDRAM 120 is set as cache memories [0] to [N−1], and cache memory controllers [0] to [N−1] are connected to inputs and outputs of a corresponding eDRAM controller 122. Also, in this embodiment, data acquirers fetch [0] to fetch [N−1] including cache memories [0] to [4N−1] and cache memory controls [0] to [4N−1] are incorporated in the stacked memory 130.

As in the above-described FIGS. 6A and 6B, for the multiport shared cache, a prefetch unit 410 and a fetch unit 430 are loosely coupled by a command intermediate FIFO. Hence, in the manner of embodiment, the prefetch unit 410 is inserted in the insertion position of the multiport shared cache according to the first embodiment in FIG. 1A, and the corresponding fetch unit 430 is incorporated in the input/output of the eDRAM 120 and the stacked memory 130.

<Device Arrangement>

Figure 13:
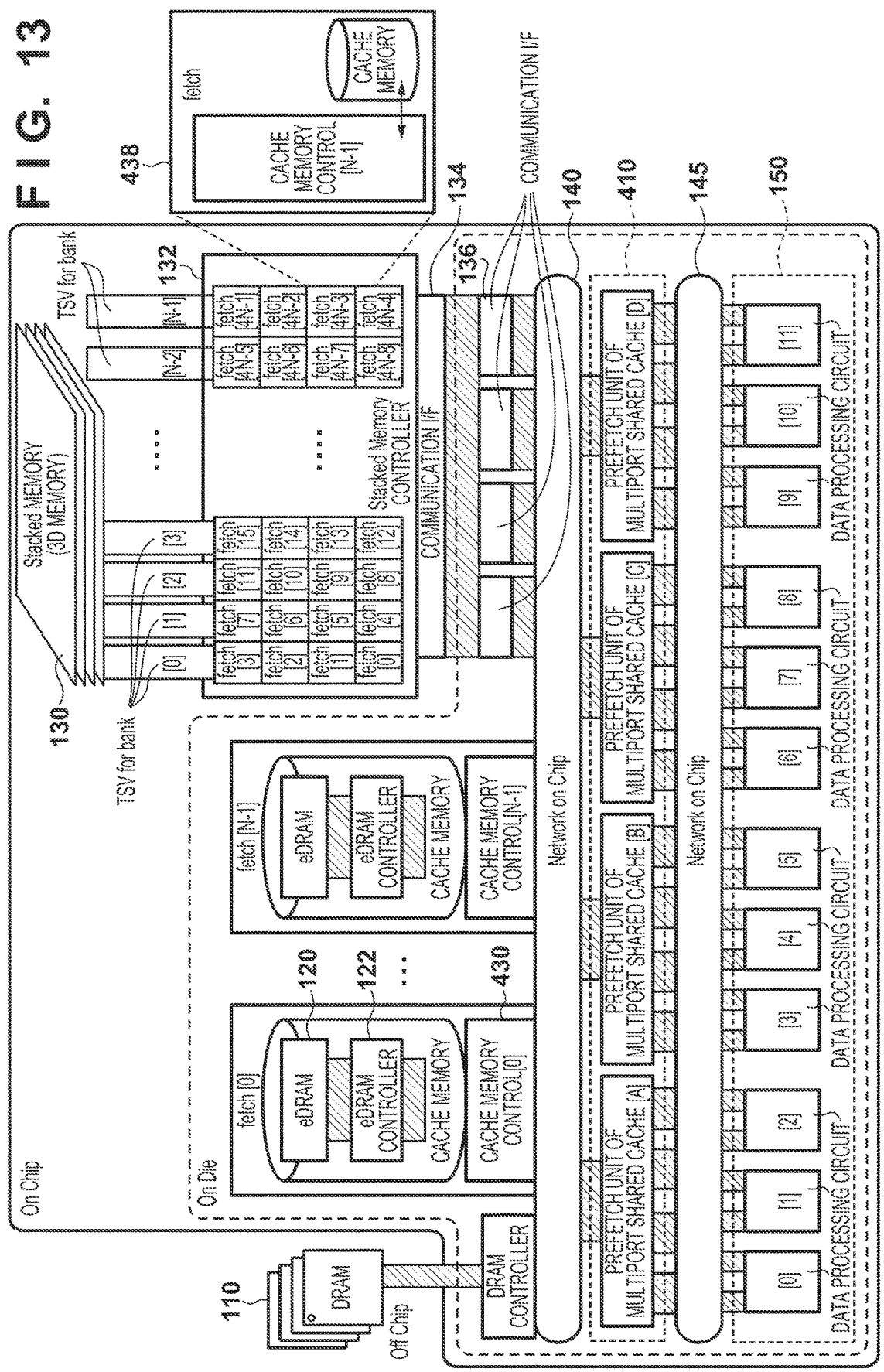
FIG. 13 is a block diagram showing the arrangement of an information processing apparatus according to the second embodiment.

FIG. 13 is a block diagram showing the arrangement of an information processing apparatus according to the second embodiment. The stacked memory 130 is divided into a plurality of banks, and a TSV is shared by a plurality of DRAMs that have been stacked for each bank. Hence, only one layer of the DRAMs can be used as a DRAM that can be read/write-accessed in a cycle for a predetermined bank. Accordingly, the values of a different layer of the DRAMs cannot be read/written for the predetermined bank. Therefore, in the arrangement of this embodiment, since there are, for example, four layers of the DRAMs, four data acquirers 438 according to this embodiment are connected to each of the banks [0] to [N−1] for each TSV connected to the bank.

As a result, four ports for each bank, that is, a shared cache between ports of the same number as the number of the layers of the stacked memory can be arranged. In the case of a cache hit, this arrangement allows simultaneous data acquisition to be performed for data requests to four conflicting layers of the DRAMs for each bank. Therefore, even if data requests from a plurality of prefetch units 410 of the multiport shared cache concentrate to the same bank and data requests are made simultaneously to different layers of DRAMs in a single bank, the speed will not be reduced as long as cache hits are determined. That is, the arrangement according to this embodiment can suppress the performance degradation of the stacked memory.

<Effect>

In the method according to this embodiment, since each eDRAM is allocated as a cache memory, the cache capacity can be greatly increased. As described above, the cache determination according to this embodiment can scalably increase the port count, the number of pipeline stages, and the cache tag count for each pipeline stage. Hence, a 4096-node fully associative-type cache determination can be performed at a very high operation frequency. Therefore, a large-capacity cache memory can be implemented by using eDRAMs as cache memories.

In an eDRAM, a DRAM can be integrated with the die or the package of the chip and be connected to a logic circuit at a very wide bus width. Hence, using the eDRAM as a cache memory can increase the data length that can be read/write-accessed to the cache memory in one access. As a result, the method according to this embodiment allows a large set of cache data to be obtained at the time of a cache hit and minimizes the latency from a cache memory update such as the refill operation and the write back operation at the time of a cache miss. Therefore, an improvement of the overall system can be expected.

As described above, according to the second embodiment, cache memories and cache memory control are incorporated in the stacked memory 130. This arrangement allows the performance of the stacked memory 130 to be further improved.

Third Embodiment

An interface form between chips each including a multiport shared cache will be described in the third embodiment.

Conventionally, when image data that has been processed by an image processing unit 720 of a chip A is to be processed in an image processing unit 730 of a chip B, a CPU (not shown) controls a transfer DMAC (not shown) to transfer the image data from a DRAM 710 to a DRAM 712. Hence, the CPU needs to control the aforementioned DMAC to transfer large units of image data during the processing completions of respective image processors (data processing circuits) [0] to [7]. Since the number of DMACs increases as the number of image processing units (data processing circuits) is increased, DMAC control by the CPU becomes very complex, and the image processing throughput may be affected.

<Device Arrangement>

Figure 14:
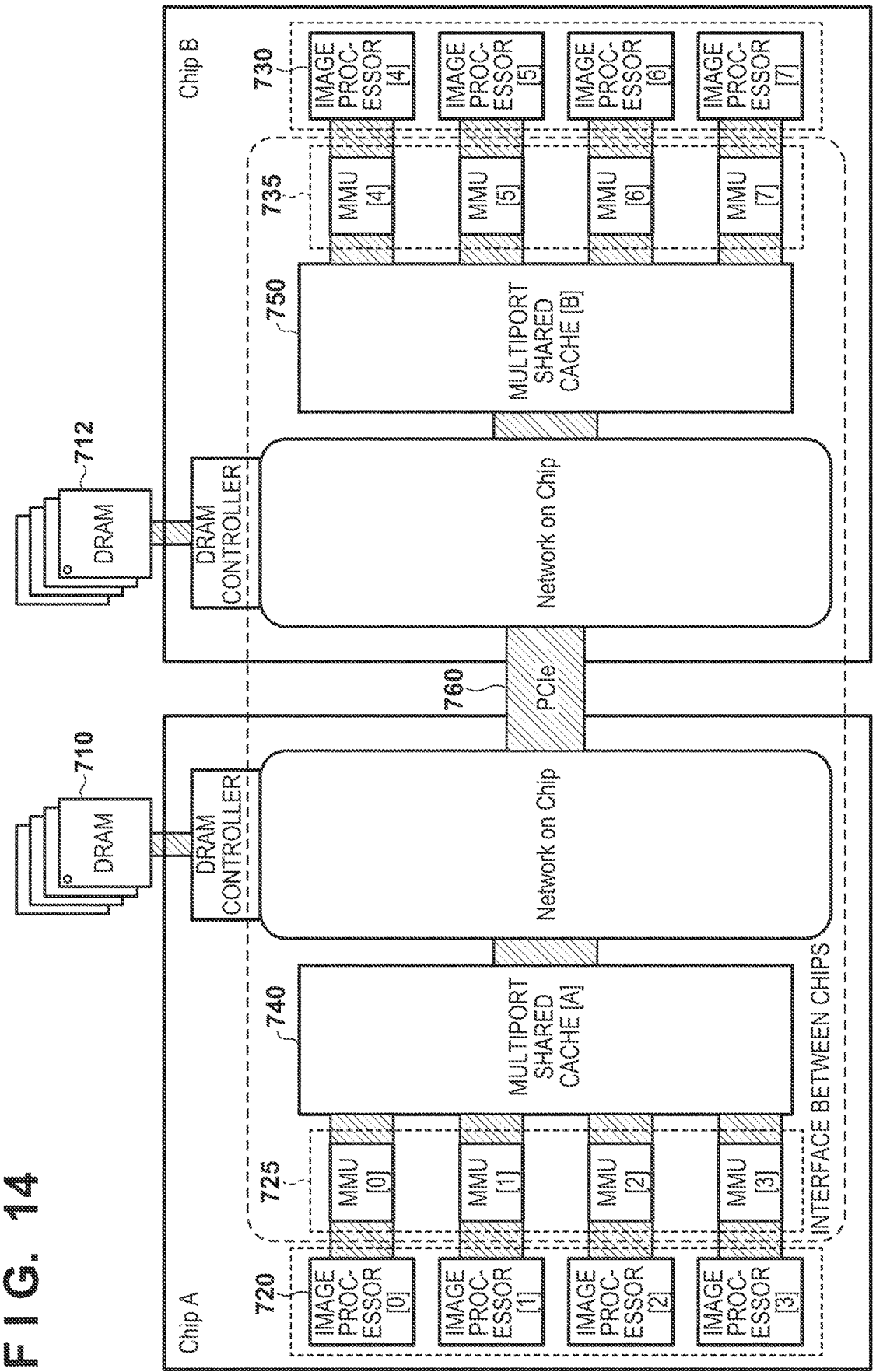
FIG. 14 is a block diagram showing the arrangement of an information processing apparatus according to the third embodiment.

FIG. 14 is a block diagram showing the arrangement of an information processing apparatus according to the third embodiment. Here, multiport shared caches are used to implement data transfer between chips. Memory management units MMU 725 and MMU 735 are arranged in the input/output portions of the image processors, respectively, and switch the addresses of data transfer destinations.

For example, in the chip A, the image processor [0] reads out image data from the DRAM 710 via a multiport shared cache [A]. At this time, the data request address is an address that indicates the DRAM 710 in an MMU [0]. The image processor [0] writes the processed image data in the multiport shared cache [A]. The MMU [0] converts the data request address used for the write operation into an address for the memory space of the DRAM 712. The processed image data is written in the multiport shared cache [A] and is output to the DRAM 712 by a write back operation when it is to be swept from the cache.

At this time, as described the above embodiments, memory access to the DRAM 710 by each of the image processors [0] to [3] is controlled, and efficient data communication to the DRAM is performed as a matter of course. Additionally, in this embodiment, memory access to the DRAM 712 of a separate chip by each of the image processors [0] to [3] can be controlled, and efficient data communication to the DRAM 712 of the separate chip can be performed.

In the chip B, the image processor [4] reads out image data from the DRAM 712 via a multiport shared cache [B] and writes the processed image data in the multiport shared cache [B]. The chip B can perform data transfer from the chip B to chip A by the same method as that of chip A.

The communication between the chips A and B is performed by a PCIe 760 in practice. The memory map of the chips A and B is determined by the overall system. When the image processors [0] to [7] and the memory management units MMU [0] to MMU [7] read/write the predetermined addresses of this memory map, the multiport shared caches, serving as an interface between the chips, autonomously execute suitable data transfers.

As described above, in the third embodiment, the CPU is not required to control the DMAC. That is, necessary data is automatically transferred from one chip to another chip through the multiport shared caches by a "store and forward (accumulation and exchange)" method.

This embodiment operates as multiport shared caches that include fully associative-type caches as described above. Hence, performance degradation such as cache conflict and thrashing hardly occur, and memory accesses by many masters can be suitably controlled to allow efficient data transfers. When changing an access destination, the data transfer length can be flexibly changed by changing the cache refill length. Also, even if the data transfer specifications of the respective image processors [0] to [7] are changed, the settings of the cache need only be changed. Therefore, a DMAC control program of the CPU need not be changed separately for each master. Furthermore, since memory accesses between the masters via the multiport shared caches are flexibly optimized, the DMAC control program need not be finely adjusted to make adjustments between the many masters.

Fourth Embodiment

The fourth embodiment will describe a form in which a multiport shared cache is used as an interface between sensors.

Conventionally, when a plurality sets of data (image data, measurement data, and the like) input from sensors are to be processed in an image processing unit 830 of a chip C, a CPU (not shown) transfers the plurality of sets of data from sensors 820 to a DRAM 812 by controlling a transfer DMAC (not shown). The CPU (not shown) then controls the transfer DMAC (not shown) to transfer the plurality of sets of data in the DRAM 812 to image processors (data processing circuits) [4] to [7] to perform data processing operations. Hence, the CPU needs to control the aforementioned DMAC to transfer large units of image data during the processing completions of respective image processors (data processing circuits) [4] to [7]. Since the number of DMACs increases as the number of sensors is increased, DMAC control by the CPU becomes very complex, and the data processing throughput may be affected.

Also, although the sensors are connected to the outside of the chip, a sensor with different specifications in accordance with the application is connected as each sensor. That is, the transfer length will vary depending on the sensor, and each DMAC control program of the CPU needs to customize the transfer length for each sensor. Additionally, if a sensor is to be replaced with another sensor due to a breakdown, it may be difficult to obtain a sensor with the same transfer specification, and the sensor may be replaced by a new type of a sensor. In such a case, the DMAC control specifications of the CPU will need to be changed to a transfer length that is different from that of the conventional sensor. If one of the DMAC control programs that operate on the CPU is changed, it may influence the DMAC control operations of other sensors. Hence, an enormous development man-hour may be necessary to change the sensor.

<Device Arrangement>

Figure 15A:
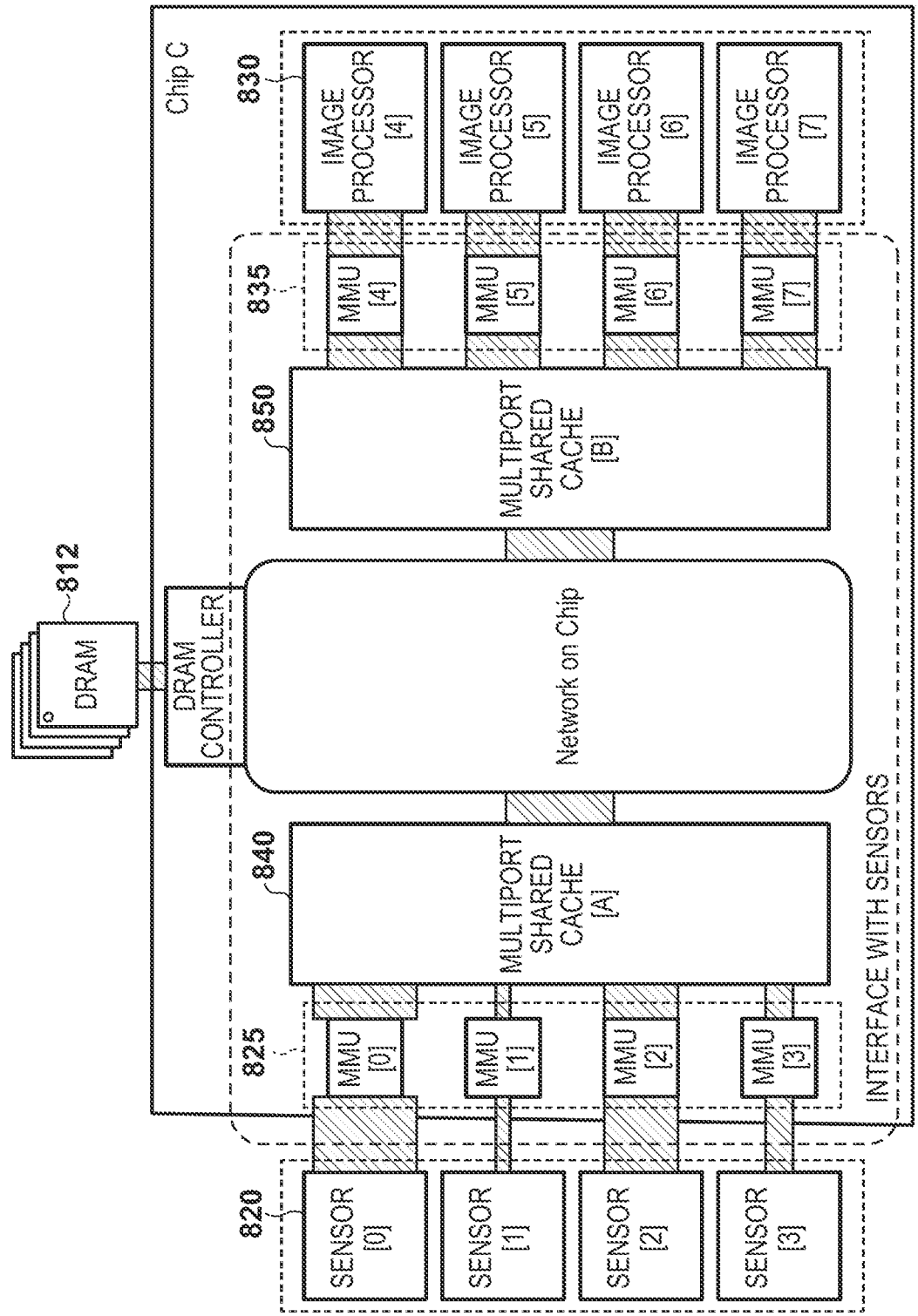
FIGS. 15A and 15B are block diagrams showing the arrangement of an information processing apparatus according to the fourth embodiment.
Figure 15B:
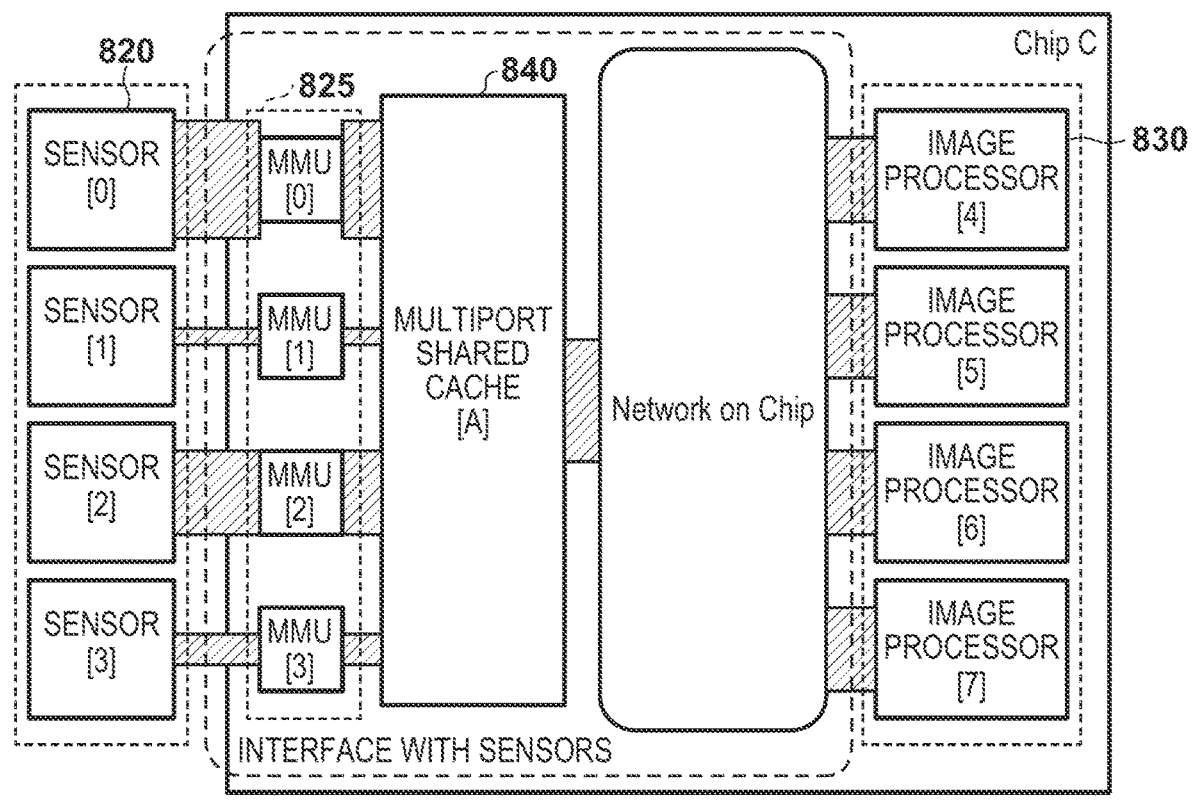

FIGS. 15A and 15B are block diagrams each showing the arrangement of an information processing apparatus according to the fourth embodiment. Here, the data transfers of the sensors are implemented by a multiport shared cache. FIG. 15A shows an arrangement in a data transfer destination address is switched by arranging a memory management unit MMU 825 in the input/output portions of the sensors and a memory management unit MMU 835 in the input/output portions of image processors. Note that, as shown in FIG. 15B, it is also possible to have an arrangement in which the memory management unit 825 is arranged only in the input/output portions of the sensors. The portion encircled by a dotted line in each drawing functions as an interface with devices (here, the sensors and the image processors).

For example, a sensor [0] writes the sensed data in a multiport shared cache [A]. At this time, an MMU [0] converts the data request address used for the write operation into an address for the memory space of the DRAM 812. The multiport shared cache [A] accumulates the sensed data and outputs the accumulated data to the DRAM 812 by a write back operation when the accumulated data is to be swept from the cache.

On the other hand, an image processor [5] can read out the sensed data from the DRAM 812 via a multiport shared cache [B]. The sensed data may also be directly transferred to the image processing unit 830 without intervention of the DRAM 812.

For example, a sensor [3] writes the sensed data in the multiport shared cache [A]. At this time, an MMU [3] converts the data request address at the time of the write operation into an address for the memory space of an image processor [6]. The multiport shared cache [A] accumulates the sensed data and outputs the accumulated data to the image processor [6] by a write back operation when the accumulated data is to be swept from the cache. Since the write back operation is performed via a multiport shared cache 840 even when the transfer lengths of the sensors 820 vary, the refill length at the time of the write back operation can be set to the size of the reception buffer of the image processor [6].

That is, in order to cope with a change in the sensor transfer length or a change in the transfer destination image processor (data processing circuit), only the refill-length register setting of the requested address or the cache need to be reset.

As described above, in the fourth embodiment, the CPU need not control the DMAC. Hence, it becomes unnecessary for the DMAC control program to be changed when a sensor is changed. That is, necessary data is automatically transferred from the sensor to an image processor or the DRAM through the multiport shared cache by a "store and forward (accumulation and exchange)" method.

The multiport shared cache according to this embodiment is efficient since a fully associative-type cache has been adopted.

In this embodiment, very high-speed determination processing can be performed in parallel for a plurality of sensors by using a fully associative-type cache with a counter pipeline arrangement as described above. Therefore, this embodiment is effective in connecting sensors for which real-time characteristics are important and in transferring sensed data to an image processor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-056459, filed Mar. 22, 2017, which is hereby incorporated by reference herein in its entirety.

What is claimed is:

1. An interface device that includes N ports, wherein N is an integer greater than or equal to 2, comprising:
    a cache memory that is shared by the N ports and includes a plurality of cache tags, wherein each of the plurality of cache tags is allocated to one of the N ports; and
    a cache determination unit corresponding to one of the N ports,
    wherein the cache determination unit comprises:
        a determiner configured to determine that a cache miss has occurred or not in the cache memory based on values of the plurality of cache tags allocated to the N ports if data request is broadcasted, and
        an update unit configured to update, when the determiner determines that a cache miss has occurred, values of the plurality of cache tags allocated to the N ports, and
    wherein, in the determiner,
    a data request address value string in the one of the N ports is configured as a first pipeline,
    a cache tag string in the one of the N ports is configured as a second pipeline which serves as a counterflow pipeline, and
    data request address value strings in the others of the N ports are configured as (N−1) third pipelines, and
    wherein the determiner includes:
        a first determiner configured to perform a cache miss determination by comparing a node of the first pipeline and a node of the second pipeline,
        a second determiner configured to perform the cache miss determination by comparing the node of the first pipeline and nodes of the (N−1) third pipelines, and
        a third determiner configured to perform a final determination by tallying determination results from the first determiner and the second determiner.

2. The device according to claim 1, wherein the cache memory is configured as a fully associative-type cache memory.

3. The device according to claim 1, further comprising:
    an acquisition unit configured to acquire, when the determiner determines that the cache miss has occurred, data from an external memory connected to a bus via the bus, which is connected by a port different from the N ports, and to store the acquired data in the cache memory.

4. The device according to claim 3, wherein N devices are connected to the N ports, and a data transfer length in at least one device is different from a data transfer length in another device.

5. The device according to claim 3, wherein at least one of a reception area for a read request and a transmission area for a write request when a cache miss has occurred is allocated to the cache memory.

6. The device according to claim 1, further comprising:
    a synchronization pointer configured to manage synchronization of the N ports,
    wherein the update unit updates the synchronization pointer at the time of one of a cache miss, cache sharing, and writing to the cache memory.

7. The device according to claim 1, wherein there are the same number of ports as the layers of a stacked memory connected by TSV (Through Silicon Via).

8. The device according to claim 1, wherein the cache memory includes an embedded DRAM.

9. The device according to claim 1, further comprising:
    a memory management unit configured to change data request address values of each port in accordance with a transfer destination.

10. The device according to claim 1, wherein the cache tags allocated to the one of the N ports and the cache tags allocated to the others of the N ports do not belong to the same set.

11. A control method of an interface device that includes N ports, wherein N is an integer greater than or equal to 2, the interface device comprising a cache memory that is shared by the N ports and includes a plurality of cache tags, wherein each of the plurality of cache tags is allocated to one of the N ports, and a cache determination unit corresponding to one of the N ports,
    the control method comprising:
    determining, by the cache determination unit, that a cache miss has occurred or not in the cache memory based on values of the plurality of cache tags allocated to the N ports if data request is broadcasted, and
    updating, in each of the N cache determination units, when it is determined that a cache miss has occurred, values of the plurality of cache tags allocated to the N ports,
    wherein the determining includes:
        a first determining operation to perform a cache miss determination by comparing data request address values in the one of the N ports and the values of cache tags allocated to the one of the N ports,
        a second determining operation to perform the cache miss determination by comparing data request address values in the one of the N ports and the values of cache tags allocated to the others of the N ports, and
        a third determining operation to perform a final determination by tallying determination results from the first determining operation and the second determining operation, and
    wherein in the determining,
    a data request address value string in the one of the N ports is configured as a first pipeline, a cache tag string in the one of the N ports is configured as a second pipeline which serves as a counterflow pipeline, data request address value strings in the others of the N ports are configured as (N−1) third pipelines, the first determining operation is configured to compare a node of the first pipeline and a node of the second pipeline, and the second determining operation is configured to compare the node of the first pipeline and nodes of the (N−1) third pipelines.

12. The method according to claim 11, further comprising:

acquiring, when it is determined that the cache miss has occurred in the determining, data from an external memory connected to a bus via the bus, which is connected by a port different from the N ports, and storing the acquired data in the cache memory.

13. The method according to claim 11, wherein the interface device comprises a synchronization pointer configured to manage synchronization of the N ports, and in the updating, the synchronization pointer is updated at the time of one of a cache miss, cache sharing, and writing to the cache memory.

14. The method according to claim 11, further comprising:

changing data request address values of the respective ports in accordance with a transfer destination.

15. The method according to claim 11, wherein in the determining, when data request address values in the one of the N ports do not match the cache tags allocated to the one of the N ports, performing the determining on cache tags allocated to the others of the N ports.

16. A non-transitory computer-readable recording medium storing a program that causes a computer that includes N ports, wherein N is an integer greater than or equal to 2, to function as an interface device comprising:

a cache memory that is shared by the N ports and includes a plurality of cache tags, wherein each of the plurality of cache tags is allocated to one of the N ports; and a cache determination unit corresponding to one of the N ports, wherein the cache determination unit comprises:

a determiner configured to determine that a cache miss has occurred or not in the cache memory based on values of the plurality of cache tags allocated to the N ports if data request is broadcasted, and an update unit configured to update, when the determiner determines that a cache miss has occurred, values of the plurality of cache tags allocated to the N ports, and wherein, in the determiner, a data request address value string in the one of the N ports is configured as a first pipeline, a cache tag string in the one of the N ports is configured as a second pipeline which serves as a counterflow pipeline, and data request address value strings in the others of the N ports are configured as (N−1) third pipelines, and wherein the determiner includes:

a first determiner configured to perform a cache miss determination by comparing a node of the first pipeline and a node of the second pipeline, a second determiner configured to perform the cache miss determination by comparing the node of the first pipeline and nodes of the (N−1) third pipelines, and a third determiner configured to perform a final determination by tallying determination results from the first determiner and the second determiner.

* * * * *